(12) United States Patent
Nakamura et al.

(10) Patent No.: US 12,532,390 B2
(45) Date of Patent: Jan. 20, 2026

(54) HEATING COOKING APPARATUS

(71) Applicant: SHARP KABUSHIKI KAISHA, Sakai (JP)

(72) Inventors: Kiyonori Nakamura, Sakai (JP); Yu Shinohara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 824 days.

(21) Appl. No.: 17/793,312

(22) PCT Filed: Jan. 14, 2021

(86) PCT No.: PCT/JP2021/001061
§ 371 (c)(1),
(2) Date: Jul. 15, 2022

(87) PCT Pub. No.: WO2021/145380
PCT Pub. Date: Jul. 22, 2021

(65) Prior Publication Data
US 2023/0050020 A1 Feb. 16, 2023

(30) Foreign Application Priority Data
Jan. 16, 2020 (JP) .................................. 2020-005213

(51) Int. Cl.
*H05B 6/64* (2006.01)
*F24C 15/16* (2006.01)
*F24C 15/32* (2006.01)

(52) U.S. Cl.
CPC ......... *H05B 6/6473* (2013.01); *F24C 15/162* (2013.01); *F24C 15/325* (2013.01); *H05B 6/6414* (2013.01)

(58) Field of Classification Search
CPC .... F24C 15/006; F24C 15/162; F24C 15/325; H05B 6/6414; H05B 6/6458; H05B 6/6473; H05B 6/6485
(Continued)

(56) References Cited

U.S. PATENT DOCUMENTS 8,253,084 B2 8/2012 Toyoda et al.
8,610,035 B2 * 12/2013 Yoshidome ........... F24C 15/006
219/452.11
(Continued)

FOREIGN PATENT DOCUMENTS

EP 4019847 A1 6/2022
JP 2006-302682 A 11/2006
(Continued)

*Primary Examiner* — Quang T Van
(74) *Attorney, Agent, or Firm* — ScienBiziP, P.C.

(57) ABSTRACT

A heating cooking apparatus (1) includes a heating cooking chamber (10), heat supply units (41), (42), and (44), a housing (14), a fan (50), a pull-out body (13), a slide rail (30), and guide portions (52a) and (52c). The heat supply units (41), (42), and (44) supply heat to an interior of the heating cooking chamber (10). The housing (14) accommodates the heating cooking chamber (10). The fan (50) is disposed in a space (R) formed between an outer surface of the heating cooking chamber (10) and an inner surface of the housing (14). The fan (50) generates an air flow (BF). The pull-out body (13) can be freely pulled out relative to the heating cooking chamber (10). The slide rail (30) is attached to the outer surface of the heating cooking chamber (10). The slide rail (30) slidably supports the pull-out body (13). The guide portions (52a) and (52c) guide the air flow (BF) so that the air flow (BF) flows along the slide rail (30).

5 Claims, 21 Drawing Sheets

(58) Field of Classification Search
USPC .......................................... 219/681, 756, 385
See application file for complete search history.

(56) References Cited

U.S. PATENT DOCUMENTS

| | | |
|---|---|---|
| 10,154,549 B2 | 12/2018 | Nasu et al. |
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |
| 2017/0171921 A1 | 6/2017 | Nasu et al. |

FOREIGN PATENT DOCUMENTS

| | | |
|---|---|---|
| JP | 2010-133634 A | 6/2010 |
| JP | 2016-056968 A | 4/2016 |

\* cited by examiner

HEATING COOKING APPARATUS

TECHNICAL FIELD

The present invention relates to a heating cooking apparatus.

BACKGROUND ART

A heating cooking apparatus including a heating cooking chamber and a pull-out body is known. The heating cooking chamber includes an accommodation space. The pull-out body includes an opening/closing door. The pull-out body is disposed to be able to be pulled out relative to the accommodation space. Such a heating cooking apparatus is assembled in a cabinet of a system kitchen.

PTL 1 discloses a heating cooking apparatus. Heating functions of the heating cooking apparatus disclosed in PTL 1 include a microwave heating function and a high-speed hot air heating function. The microwave heating function is a function of irradiating an object to be heated with microwaves. The high-speed hot air heating function is a function of blowing out hot air toward an object to be heated at high speed.

CITATION LIST

Patent Literature

PTL JP 2010-133634 A

SUMMARY OF INVENTION

Technical Problem

Unfortunately, in the heating cooking apparatus disclosed in PTL 1, in a case where the high-speed hot air heating function is used, the temperature of the outer surface of a heating cooking chamber may rise with a rise in the temperature inside the heating cooking chamber. Therefore, the temperature around the outer surface of the heating cooking chamber may rise. A slide rail that moves a pull-out body into the heating cooking chamber is disposed around the outer surface of the heating cooking chamber. Thus, the temperature of the slide rail disposed around the outer surface of the heating cooking chamber may rise.

In light of the above problem, an object of the present invention is to provide a heating cooking apparatus that can efficiently cool a slide rail.

Solution to Problem

A heating cooking apparatus of the present invention includes a heating cooking chamber, a heat supply unit, a housing, a fan, a pull-out body, a slide rail, and a guide portion. An object to be heated is accommodated in the heating cooking chamber. The heat supply unit supplies heat to an interior of the heating cooking chamber. The housing accommodates the heating cooking chamber. The fan is disposed in a space formed between an outer surface of the heating cooking chamber and an inner surface of the housing. The fan generates an air flow. The pull-out body can be freely pulled out relative to the heating cooking chamber. The slide rail is attached to the outer surface of the heating cooking chamber. The slide rail slidably supports the pull-out body. The guide portion guides the air flow so that the air flow flows along the slide rail.

Advantageous Effects of Invention

According to a heating cooking apparatus of the present invention, it is possible to efficiently cool a slide rail.

DESCRIPTION OF EMBODIMENTS

Figure 1:
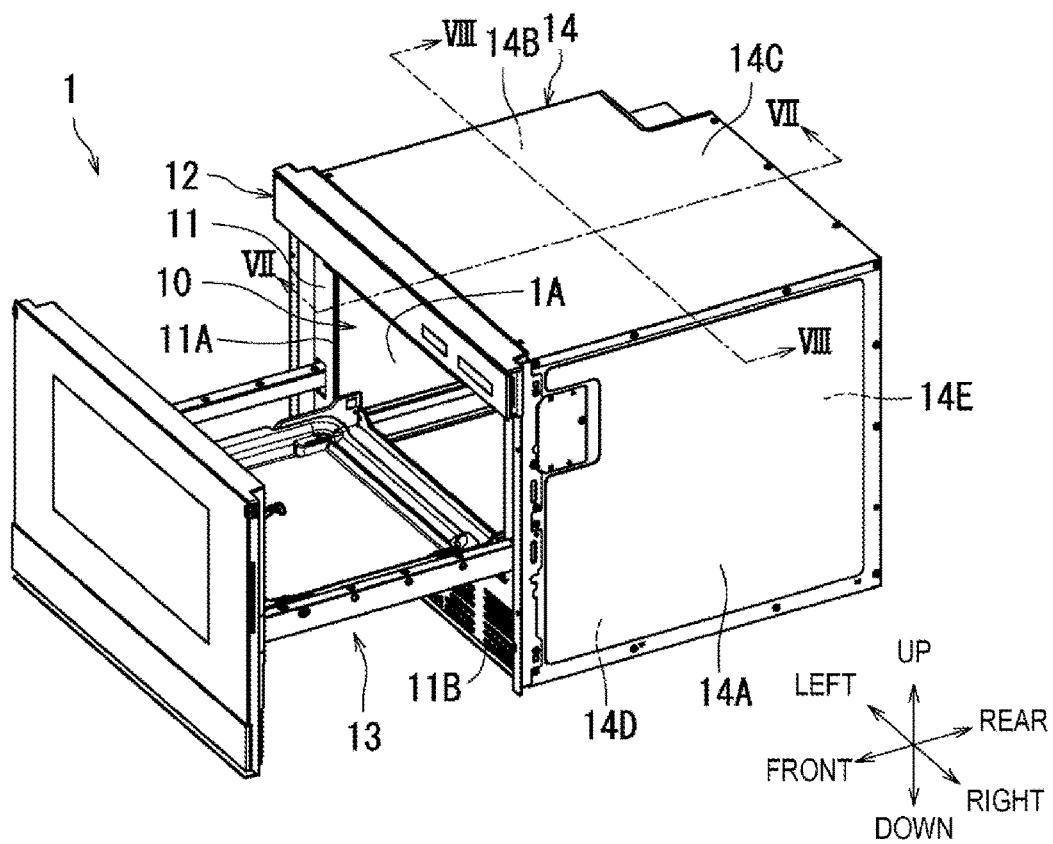
FIG. 1 is a perspective view of a heating cooking apparatus according to an embodiment of the present invention.

An embodiment of a heating cooking apparatus according to the present invention will be described below with reference to the drawings. Note that, in the drawings, the same or equivalent components are denoted by the same reference numerals and signs, and description thereof will not be repeated.

Figure 2:
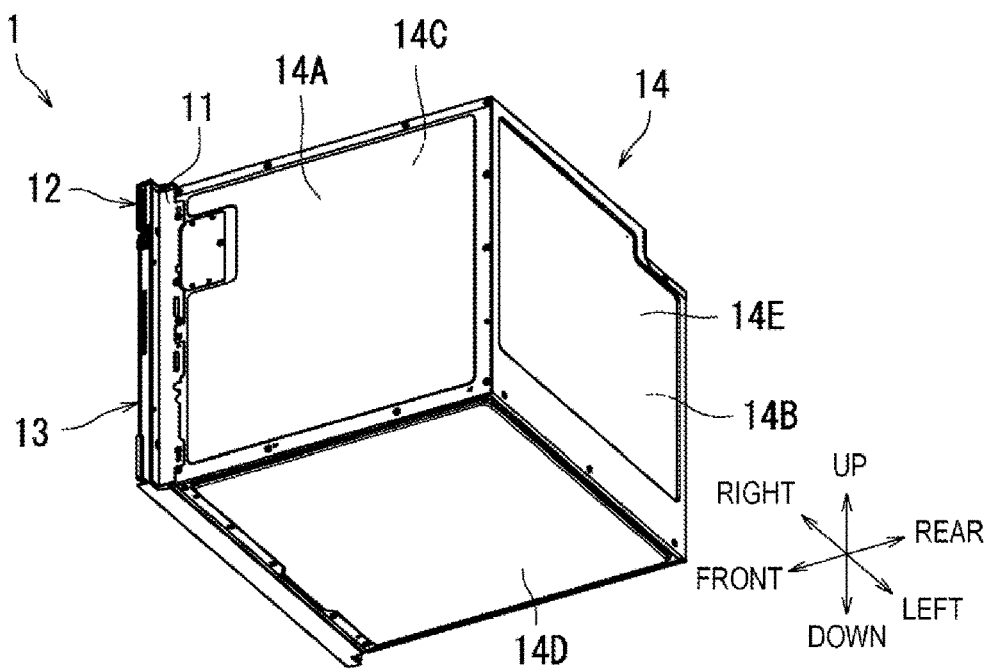
FIG. 2 is a perspective view of the heating cooking apparatus according to the embodiment of the present invention.

With reference to FIG. 1 and FIG. 2, a heating cooking apparatus 1 according to the present embodiment will be described. FIG. 1 and FIG. 2 are perspective views of the heating cooking apparatus 1 according to the present embodiment. More specifically, FIG. 1 illustrates the heating cooking apparatus 1 in an upper right diagonal direction from the front. FIG. 2 illustrates the heating cooking apparatus 1 in a lower right diagonal direction from behind.

The heating cooking apparatus 1 is used to heat and cook an object to be heated. The object to be heated is, for example, food. As illustrated in FIG. 1, the heating cooking apparatus 1 includes a heating cooking chamber 10, a panel 11, an operation panel unit 12, a pull-out body 13, and a housing 14.

In the present embodiment, a side on which the operation panel unit 12 of the heating cooking apparatus 1 is disposed is defined as a "front side", and a side opposite thereto is defined as a "rear side". Further, a right side as viewed from the front side of the heating cooking apparatus 1 is defined as a "right side", and a side opposite thereto is defined as a "left side". Further, a side on which the operation panel unit 12 is disposed in a direction orthogonal to a front-rear direction and a left-right direction of the heating cooking apparatus 1 is defined as an "upper side", and a side opposite thereto is defined as a "lower side". Note that these directions are not intended to limit the directions of the heating cooking apparatus according to the present invention when the heating cooking apparatus is used.

The heating cooking chamber 10 is a box-like member. The heating cooking chamber 10 internally includes an accommodation space 1A. The accommodation space 1A accommodates an object to be heated.

In the present embodiment, the heating cooking apparatus 1 includes, as heating cooking modes, a microwave heating mode, a first hot air circulation heating mode, a second hot air circulation heating mode, and a grill heating mode. The microwave heating mode is mainly a mode in which an object to be heated is heated and cooked through radiation of microwaves into the accommodation space 1A. The first hot air circulation heating mode is mainly a mode in which an object to be heated is heated and cooked by circulating first hot air H1 in the accommodation space 1A. The second hot air circulation heating mode mainly includes a first mode and a second mode. The first mode is a mode in which an object to be heated is heated and cooked by directly blowing second hot air H2 onto an upper surface of the object to be heated. The second mode is a mode in which the inside of the accommodation space 1A is preheated in a short time by circulating the second hot air H2 in the accommodation space 1A. The grill heating mode is mainly a mode in which an object to be heated is heated and cooked by exposing the object to be heated to heat radiation.

The panel 11 is disposed on the front side of the heating cooking chamber 10. The panel 11 includes an opening portion 11A. The opening portion 11A is located at a substantially center portion of the panel 11. The opening portion 11A has a rectangular shape. The opening portion 11A communicates with the accommodation space 1A. Details of the panel 11 will be described below with reference to FIG. 6.

The operation panel unit 12 receives operation from a user. The operation panel unit 12 is disposed further forward than the panel 11. In other words, the operation panel unit 12 is disposed in front of the heating cooking chamber 10. The operation panel unit 12 is located at an upper portion of the heating cooking apparatus 1.

The pull-out body 13 can be pulled out freely relative to the heating cooking chamber 10 in the front-rear direction. More specifically, the pull-out body 13 is pulled out in the front direction of the heating cooking chamber 10. The pull-out body 13 is located below the operation panel unit 12. Details of the configuration of the pull-out body 13 will be described below with reference to FIG. 3 and FIG. 4.

The housing 14 accommodates the heating cooking chamber 10. The housing 14 is an object habing a rectangular parallelepiped shape with an open front side. As illustrated in FIG. 2, the housing 14 includes a right wall 14A, a left wall NB, an upper wall 14C, a lower wall 14D, and a rear wall 14E.

Figure 3:
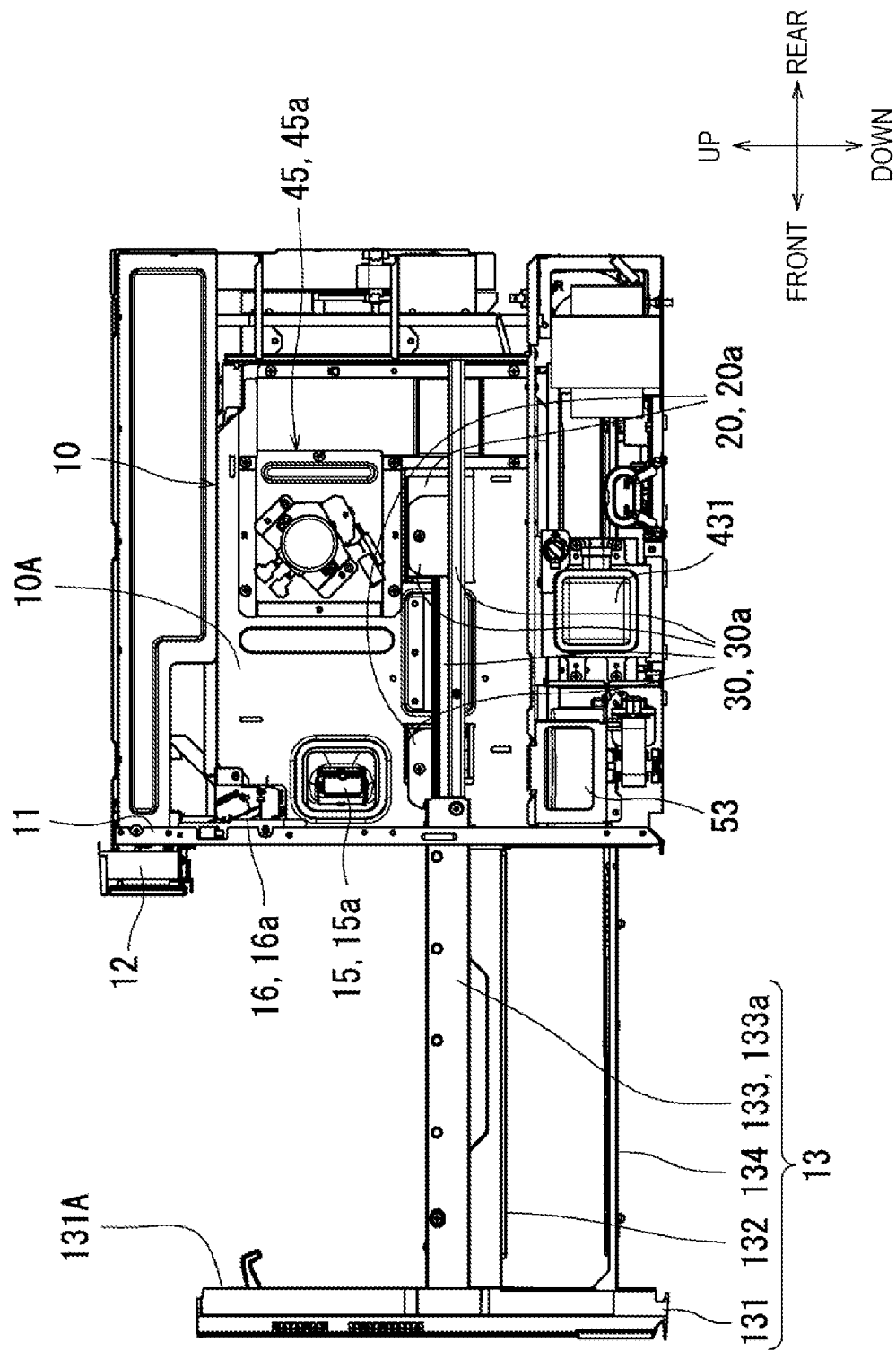
FIG. 3 is a diagram illustrating a right side surface of the heating cooking apparatus according to the embodiment of the present invention.
Figure 4:
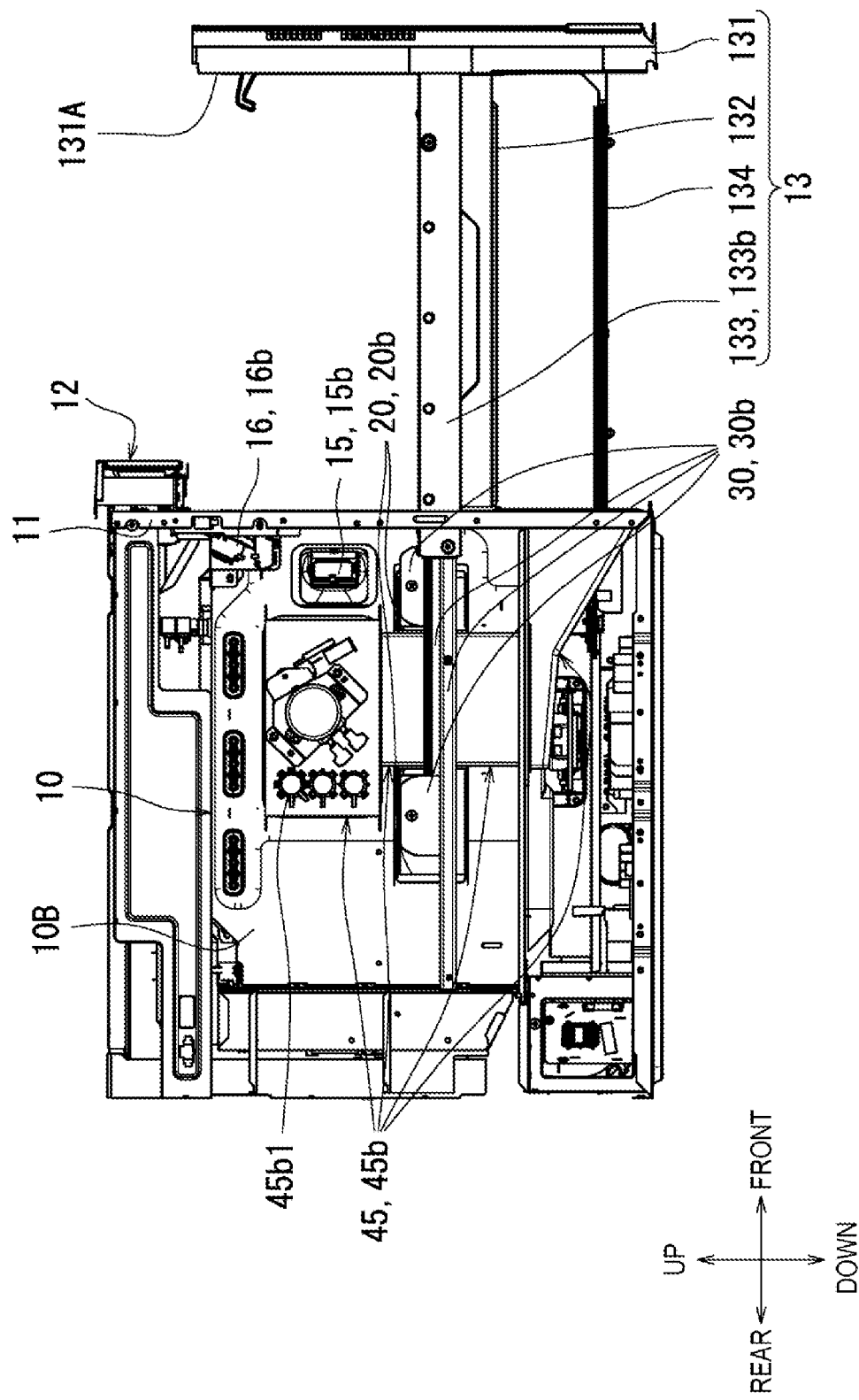
FIG. 4 is a diagram illustrating a left side surface of the heating cooking apparatus according to the embodiment of the present invention.
Figure 5:
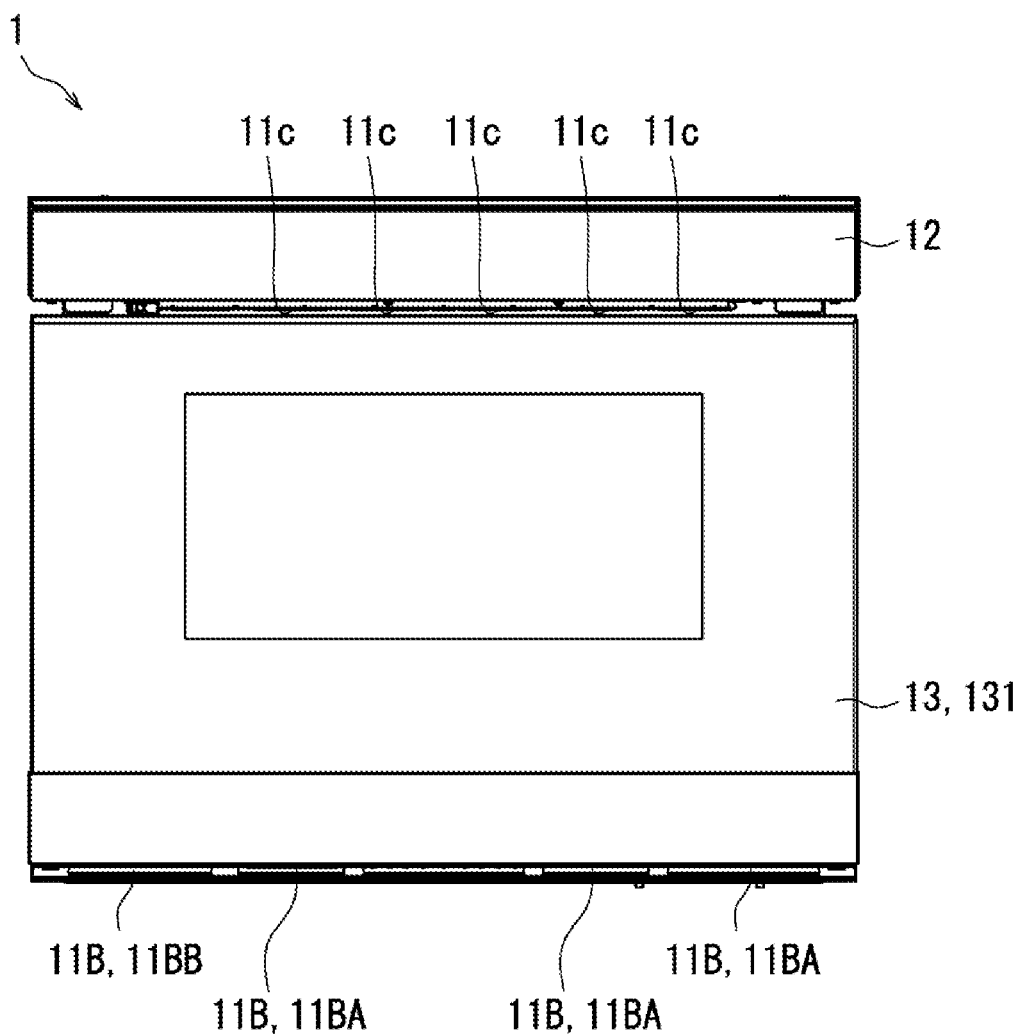
FIG. 5 is a front view of the heating cooking apparatus according to the embodiment of the present invention.
Figure 5:
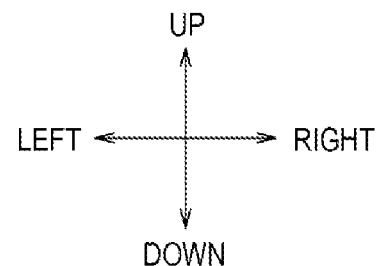

Next, the pull-out body 13 will be further described with reference to FIG. 1 to FIG. 5. FIG. 3 is a diagram illustrating a right side surface of the heating cooking apparatus 1 according to the present embodiment. More specifically, FIG. 3 illustrates the right side surface of the heating cooking apparatus 1 in a state where the housing 14 is removed. FIG. 4 is a diagram illustrating a left side surface of the heating cooking apparatus 1 according to the present embodiment. More specifically, FIG. 4 illustrates the left side surface of the heating cooking apparatus 1 in a state where the housing 14 is removed. FIG. 5 is a front view of the heating cooking apparatus 1 according to the present embodiment.

As illustrated in FIG. 3 and FIG. 4, the pull-out body 13 includes a door portion 131, a placing portion 132, a pair of left and right slide members 133, and a support member 134.

The door portion 131 is capable of opening and closing the opening portion 11A (see FIG. 1) of the panel 11. As illustrated in FIG. 5, the door portion 131 is a substantially rectangular plate-like member.

An object to be heated can be placed on the placing portion 132. As illustrated in FIG. 3 and FIG. 4, the door portion 131 has a rear surface 131A. The placing portion 132 is attached to the rear surface 131A of the door portion 131.

The pair of left and right slide members 133 supports the door portion 131. The pair of left and right slide members 133 supports the placing portion 132 by supporting the door portion 131. The pair of left and right slide members 133 is attached to the rear surface 131A of the door portion 131. Each of the pair of left and right slide members 133 includes a right slide member 133a (see FIG. 3) with the front-rear direction as a longitudinal direction, and a left slide member 133b (see FIG. 4) with the front-rear direction as a longitudinal direction.

The support member 134 supports the door portion 131. The support member 134 supports the placing portion 132 by supporting the door portion 131. The support member 134 is attached at a substantially center portion of the rear surface 131A of the door portion 131 in the left-right direction, and below the placing portion 132, The support member 134 is a plate-like member with the front-rear direction as a longitudinal direction.

The support member 134 includes a rack portion. The rack portion includes a plurality of teeth. The heating cooking apparatus 1 includes a drive mechanism 46 to be described below with reference to FIG. 16. The drive mechanism 46 is accommodated in an air intake space AR to be described below with reference to FIG. 8. The drive mechanism 46 causes the pull-out body 13 to be in an opened state or a closed state by engaging with the rack portion of the support member 134. The opened state of the pull-out body 13 is a state where the placing portion 132 of the pull-out body 13 is pulled out from the accommodation space 1A. The closed state of the pull-out body 13 is a state where the placing portion 132 of the pull-out body 13 is pulled into the accommodation space 1A.

Figure 6:
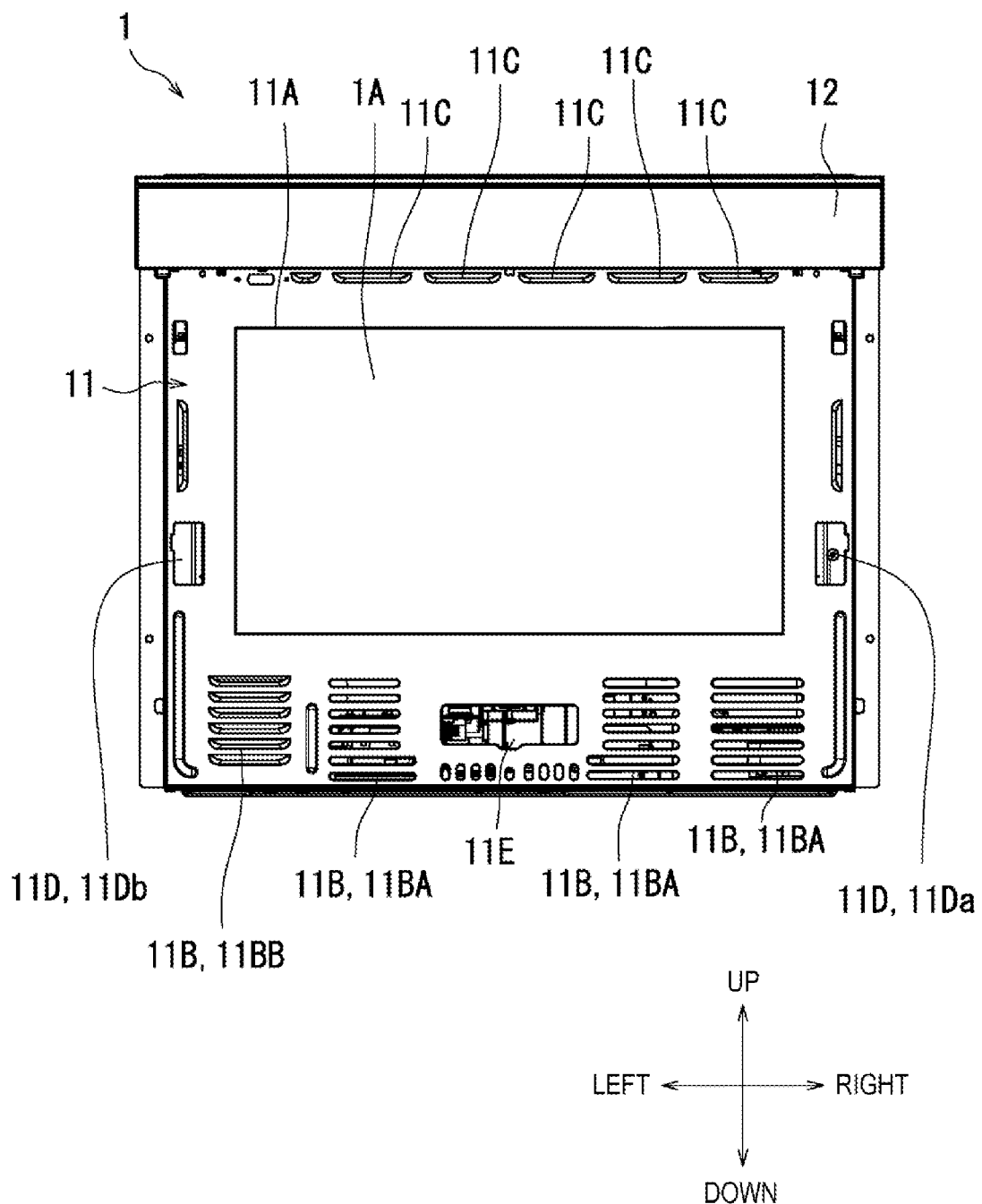
FIG. 6 is a front view of the heating cooking apparatus according embodiment of the present invention.

Next, the panel 11 will be further described with reference to FIG. 1 to FIG. 6. FIG. 6 is a front view of the heating cooking apparatus 1 according to the present embodiment, More specifically, FIG. 6 illustrates the heating cooking apparatus 1 in a state where the pull-out body 13 is removed.

As illustrated in FIG. 6, the panel 11 is a rectangular plate-like member. The panel 11 includes a plurality of first through hole portions 11B, a plurality of second through hole portions 11C, a pair of third through hole portions 11D, and a fourth through hole portion 11E, in addition to the opening portion 11A. Hereinafter, the plurality of second through hole portions 11C will be collectively referred to as an "exhaust hole portion 11C".

The plurality of first through hole portions 11B are located at a portion below the opening portion 11A of the panel 11. The plurality of first through hole portions 11B form four columns. In the present embodiment, each of the four columns is composed of six or seven first through hole portions 11B disposed in a row along an up-down direction. Two columns of the four columns are located at a portion proximate to a right end of the panel 11. The other two columns of the four columns are located at a portion proximate to a left end of the panel 11. Hereinafter, the seven first through hole portions 11B constituting each column except for the leftmost column among the four columns may be collectively referred to as an "air intake hole portion 11BA". Hereinafter, the six first through hole portions 11B constituting the leftmost column among the four columns may be collectively referred to as an "exhaust hole portion 11BB". The air intake hole portions 11BA communicate a space R to be described below with reference to FIG. 7 and FIG. 8 and the outside of the heating cooking apparatus 1 with each other. The air intake hole portions 11BA are located upstream relative to a blown air flow BF that is blown out by a cooling fan 50 to be described below with reference to FIGS. 9 to FIG. 11.

The exhaust hole portion 11C communicates the space R to be described below with reference to FIG. 7 and FIG. 8 and the outside of the heating cooking apparatus 1 with each other. The exhaust hole portion 11C is located downstream relative to the blown air flow BF that is blown out by the cooling fan 50 to be described below with reference to FIG. 9 to FIG. 11. Further, the exhaust hole portion 11C is located on the panel 11 at a portion above the opening portion 11A. The plurality of second through hole portions 11C are disposed in a row from a right portion to a left portion of the panel 11. Further, as illustrated in FIG. 5, the exhaust hole portion 11C is located between the pull-out body 13 and the operation panel unit 12 in the up-down direction.

As illustrated in FIG. 6, the pair of third through hole portions 11D include a right through hole portion 11Da and a left through hole portion 11Db. The right through hole portion 11Da is located on the panel 11 at a portion to the right of the opening portion 11A, The left through hole portion 11Db is located on the panel 11 at a portion to the left of the opening portion 11A. The right slide member 133a described with reference to FIG. 3 and FIG. 4 passes through the right through hole portion 11Da of the panel 11. The left slide member 133b described with reference to FIG. 3 and FIG. 4 passes through the left through hole portion 11Db of the panel 11.

The fourth through hole portion 11E is located on the panel 11 at a portion below the opening portion 11A of the panel 11 and at a substantially center portion of the panel 11 in the left-right direction. The support member 134 described with reference to FIG. 3 and FIG. 4 passes through the fourth through hole portion 11E of the panel 11.

Next, a configuration of the heating cooking apparatus 1 will be further described with reference to FIG. 1 to FIG. 6.

As illustrated in FIG. 3 and FIG. 4, the heating cooking apparatus 1 further includes a pair of left and right support portions 20, a pair of left and right slide rails 30, a pair of left and right in-chamber light components 15, and a pair of left and right latch switches 16. The pair of left and right support portions 20 are an example of support portions. The pair of slide rails 30 are an example of slide rails.

The pair of left and right support portions 20 support the pair of left and right slide rails 30. The pair of left and right support portions 20 include a right support portion 20a (see FIG. 3) and a left support portion 20b (see FIG. 4). As illustrated in FIG. 3, the heating cooking chamber 10 includes a right wall 10A. The right support portion 20a is attached to the right wall 10A of the heating cooking chamber 10. As illustrated in FIG. 4, the heating cooking chamber 10 includes a left wall 10B. The left support portion 20b is attached to the left wall 10B of the heating cooking chamber 10. Configurations of the right support portion 20a and the left support portion 20b are substantially the same. The configuration of the right support portion 20a will be described below with reference to FIG. 12 to FIG. 14. Description of the configuration of the left support portion 20b is omitted. The right wall 10A and the left wall 10B are examples of wall portions.

The pair of left and right slide rails 30 slidably support the pull-out body 13 in the front-rear direction. As illustrated in FIG. 3 and FIG. 4, the pair of left and right slide rails 30 include a right slide rail 30a (see FIG. 3) and a left slide rail 30b (see FIG. 4).

The right slide rail 30a and the left slide rail 30b are attached to an outer surface of the heating cooking chamber 10. More specifically, as illustrated in FIG. 3, the right slide rail 30a is attached to the right support portion 20a. The right slide member 133a of the pull-out body 13 is slidably supported by the right slide rail 30a. As illustrated in FIG. 4, the left slide rail 30b is attached to the left support portion 20b. The left slide member 133b of the pull-out body 13 is slidably supported by the left slide rail 30b. Configurations of the right slide rail 30a and the left slide rail 30b are substantially the same. The configuration of the right slide rail 30a will be described below with reference to FIG. 12 and FIG. 15. The description of the configuration of the left slide rail 30b is omitted.

The pair of left and right in-chamber light components 15 illuminate inside of the accommodation space 1A (see FIG. 6), As illustrated in FIG. 3 and FIG. 4, the pair of left and right in-chamber light components 15 include a right in-chamber light component 15a (see FIG. 3) and a left in-chamber light component 15b (see FIG. 4). As illustrated in FIG. 3, the right in-chamber light component 15a is attached to a portion front of the right wall 10A of the heating cooking chamber 10. As illustrated in FIG. 4, the left in-chamber light component 15b is attached to a portion front of the left wall 10B of the heating cooking chamber 10.

The pair of left and right latch switches 16 control electrical energization for driving electrical components based on the opened state or the closed state of the pull-out body 13. More specifically, when the pull-out body 13 is in the opened state, the pair of left and right latch switches 16 cut off the energization for driving the electrical components. When the pull-out body 13 is in the closed state, the pair of left and right latch switches 16 do not cut off the energization for driving the electrical components. The electrical components include a first air sending unit 41, a second air sending unit 42, a microwave supply unit 43, and a grill unit 44, which will be described below with reference to FIG. 7 and FIG. 8.

As illustrated in FIG. 3 and FIG. 4, the pair of left and right latch switches 16 include a right latch switch 16a (see FIG. 3) and a left latch switch 16b (see FIG. 4). As illustrated in FIG. 3, the right latch switch 16a is attached to a portion above the right in-chamber light component 15a in front of the right wall 10A of the heating cooking chamber 10. As illustrated in FIG. 4, the left latch switch 16b is attached to a portion above the left in-chamber light component 15b in front of the left wall 10B of the heating cooking chamber 10.

Next, the configuration of the heating cooking apparatus 1 according to the present embodiment will be further described with reference to FIG. 1 to FIG. 8. FIG. 7 is a cross-sectional view of the heating cooking apparatus 1 along a section line VII in FIG. 1. FIG. 8 is a cross-sectional view of the heating cooking apparatus 1 along a section line VIII in FIG. 1.

Figure 7:
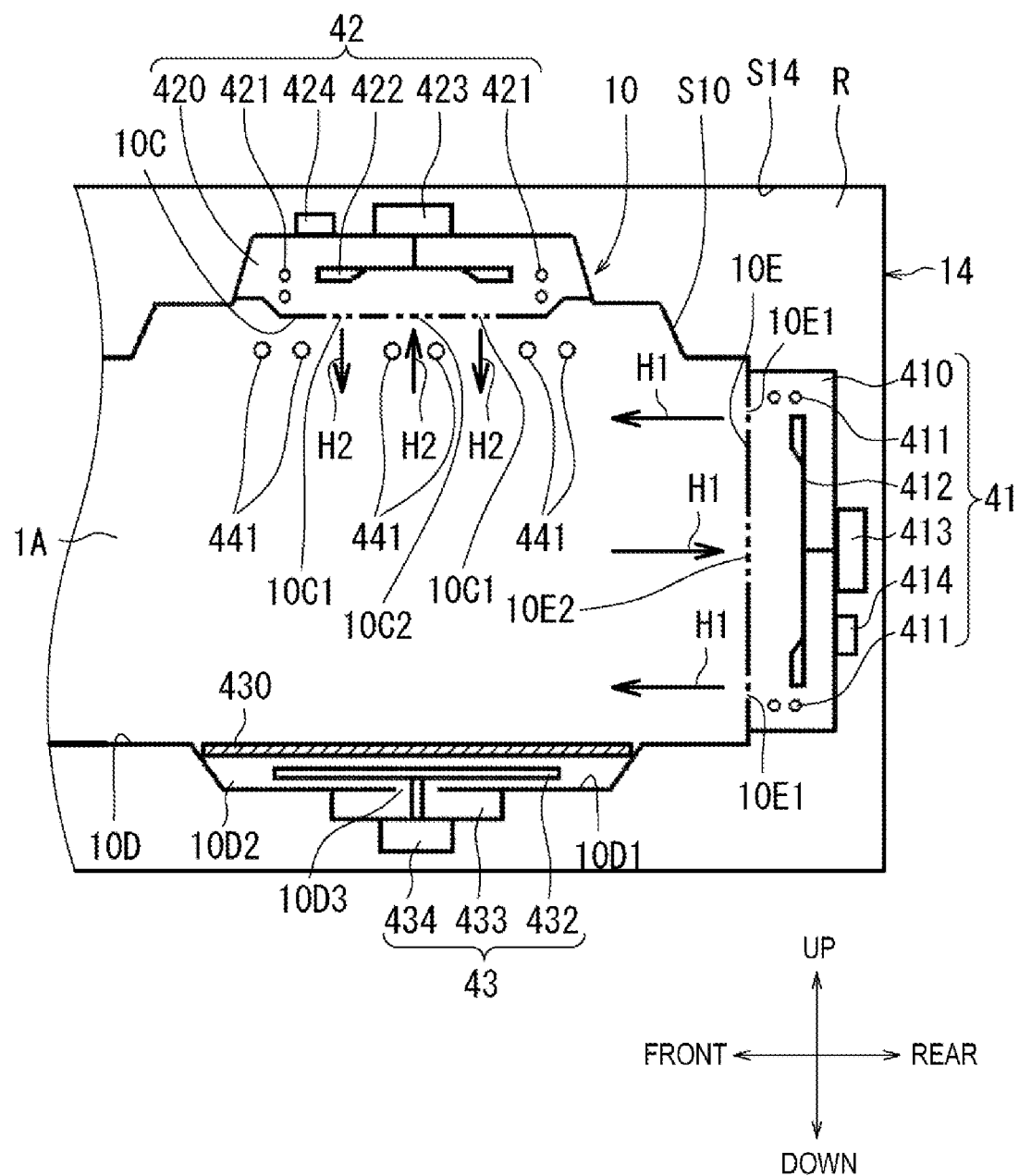
FIG. 7 is a cross-sectional view of the heating cooking apparatus along a section line VII in FIG. 1.

As illustrated in FIG. 7, the heating cooking chamber 10 includes an upper wall 10C, a lower wall 10D, and a rear wall 10E, in addition to the right wall 10A and the left wall 10B. The accommodation space 1A is formed by the right wall 10A, the left wall 10B, the upper wall 10C, the lower wall 10D, and the rear wall 10E. The accommodation space 1A of the heating cooking chamber 10 has a substantially rectangular parallelepiped shape.

Figure 8:
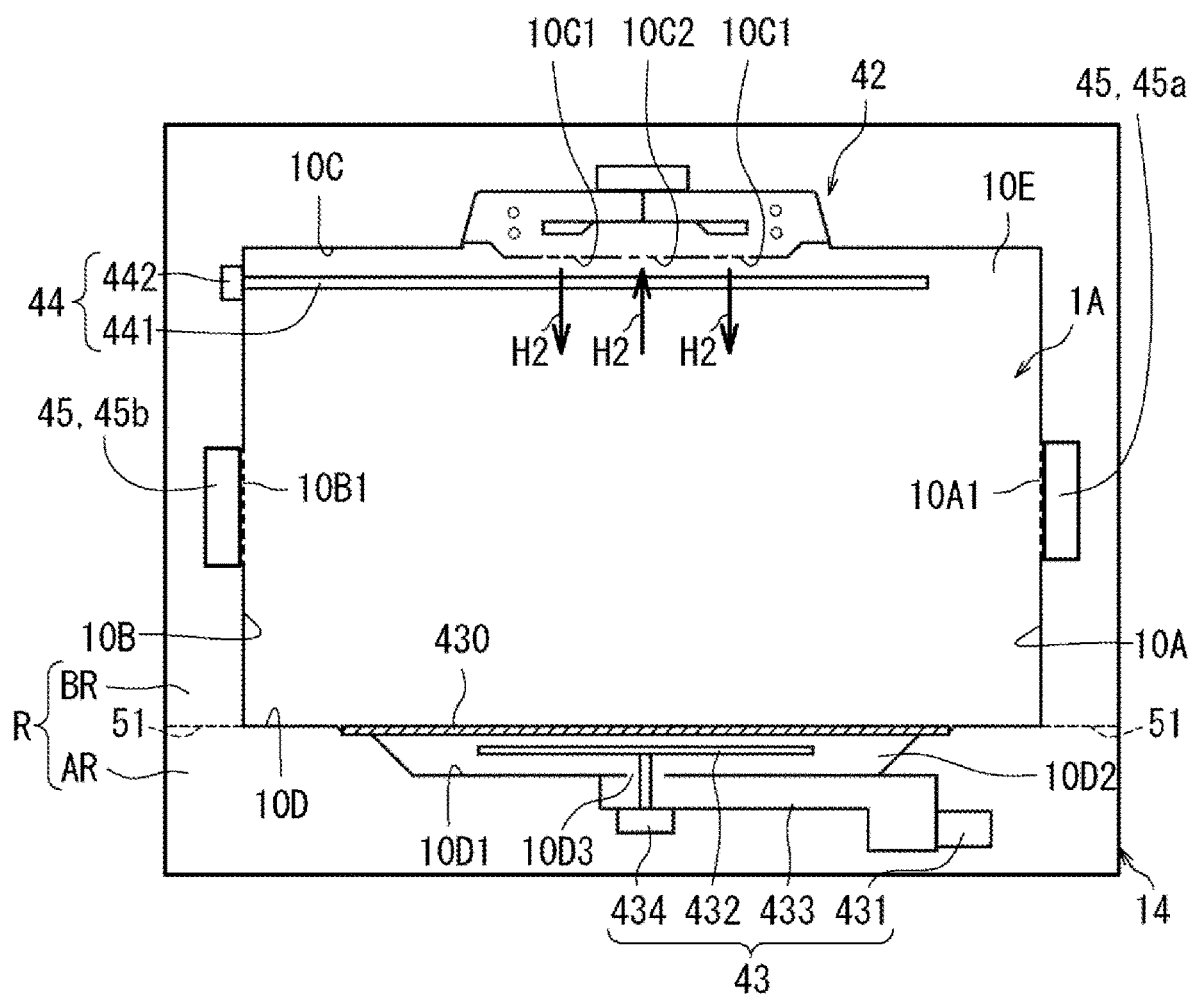
FIG. 8 is a cross-sectional view of the heating cooking apparatus along a section line VIII in FIG. 1.

The heating cooking apparatus 1 further includes the first air sending unit 41, the second air sending unit 42, the microwave supply unit 43, the grill unit 44 (see FIG. 8), and a damper unit 45 (see FIG. 8). The heating cooking apparatus 1 includes the space R. The space R is formed between an outer surface S10 of the heating cooking chamber 10 and an inner surface S14 of the housing 14. The first air sending unit 41, the second air sending unit 42, and the grill unit 44 are examples of heat supply units.

The first air sending unit 41 supplies the first hot air H1 to the interior of the accommodation space 1A. In other words, the first air sending unit 41 executes a first hot air circulation heating mode. The first air sending unit 41 is attached to the outer side of the rear wall 10E. The rear wall 10E includes a plurality of first blow-out hole portions 10E1 and a plurality of first intake hole portions 10E2. The plurality of first intake hole portions 10E2 are located at a substantially center portion of the rear wall 10E, The plurality of first blow-out hole portions 10E1 are located on the rear wall 10E at an outer portion of the plurality of first intake hole portions 10E2 in the rear wall 10E.

The first air sending unit 41 includes a first air sending chamber 410, a first heater 411, a first centrifugal fan 412, a first drive unit 413, and a first energization unit 414. The first heater 411 and the first centrifugal fan 412 are accommodated in the first air sending chamber 410, The first drive unit 413 and the first energization unit 414 are located outside the first air sending chamber 410.

The first energization unit 414 energizes the first heater 411. The energized first heater 411 heats air in the first air sending chamber 410. The first drive unit 413 drives the first centrifugal fan 412. The driven first centrifugal fan 412 blows air in the first air sending chamber 410 into the accommodation space 1A through the plurality of first blow-out hole portions 10E1. Further, the driven first centrifugal fan 412 draws the air in the accommodation space 1A into the first air sending chamber 410 through the plurality of first intake hole portions 10E2. The plurality of first intake hole portions 10E2 face the first centrifugal fan 412 in an axial direction of the first centrifugal fan 412. The first heater 411 is, for example, a sheathed heater. The first drive unit 413 is, for example, a motor.

The second air sending unit 42 supplies the second hot air to the interior of the accommodation space 1A. In other words, the second air sending unit 42 executes the second hot air circulation heating mode. The second air sending unit 42 is attached to the outer side of the upper wall 10C. The upper wall 10C includes a plurality of second blow-out hole portions 10C1 and a plurality of second intake hole portions 10C2. The plurality of second blow-out hole portions 10C1 and the plurality of second intake hole portions 10C2 are located at a substantially center portion of the upper wall 10C.

The second air sending unit 42 includes a second air sending chamber 420, a second heater 421, a second centrifugal fan 422, a second drive unit 423, and a second energization unit 424. The second heater 421 and the second centrifugal fan 422 are accommodated in the second air sending chamber 420. The second drive unit 423 and the second energization unit 424 are located outside the second air sending chamber 420.

The second energization unit 424 energizes the second heater 421. The energized second heater 421 heats air in the second air sending chamber 420. The second drive unit 423 drives the second centrifugal fan 422. The driven second centrifugal fan 422 blows air in the second air sending chamber 420 into the accommodation space 1A through the plurality of second blow-out hole portions 10C1. Further, the driven second centrifugal fan 422 draws air in the accommodation space 1A into the second air sending chamber 420 through the plurality of second intake hole portions 10C2. The plurality of second intake hole portions 10C2 face the second centrifugal fan 422 in an axial direction of the second centrifugal fan 422. The second heater 421 is, for example, a sheathed heater. The second drive unit 423 is, for example, a motor.

The microwave supply unit 43 supplies microwaves to the interior of the accommodation space 1A. In other words, the microwave supply unit 43 executes the microwave heating mode. The microwave supply unit 43 is attached to the lower wall 10D.

As illustrated in FIG. 8, the microwave supply unit 43 includes a magnetron 431, a rotary antenna 432, a waveguide 433, and an antenna motor 434. The lower wall 10D includes a recessed portion 10D1. The recessed portion 10D1 is located at a substantially center portion of the lower wall 10D. The heating cooking chamber 10 includes an oven tray 430. The oven tray 430 is attached to the lower wall 10D. The oven tray 430 is a plate-like member. The oven tray 430 covers the recessed portion 10D1. The oven tray 430 and the recessed portion 10D1 form a space 10D2 therebetween.

The rotary antenna 432 is located in the space 10D2. The magnetron 431, the waveguide 433, and the antenna motor 434 are located outside the recessed portion 10D1. The magnetron 431 generates microwaves. The recessed portion 10D1 includes a power supply hole portion 10D3. The waveguide 433 propagates the generated microwaves to the power supply hole portion 10D3. As a result, the microwaves are supplied to the interior of the accommodation space 1A via the rotary antenna 432. The antenna motor 434 drives the rotary antenna 432. The rotary antenna 432 agitates the microwaves and radiates the microwaves into the accommodation space 1A.

The material of the oven tray 430 includes ceramic or glass. Because the material of the oven tray 430 includes ceramic or glass, the oven tray 430 facilitates transmission of the microwaves. Therefore, when the microwave heating mode is executed, the microwaves are supplied from the recessed portion 10D1, and the heating cooking apparatus 1 can efficiently heat and cook an object to be heated.

The grill unit 44 supplies heat to the interior of the accommodation space 1A. The grill unit 44 executes the grill heating mode. The grill unit 44 includes a heating cooking heater unit 441 and a third energization unit 442. The heating cooking heater unit 441 is located at an upper portion in the accommodation space 1A. The third energization unit 442 is located outside the left wall 10B. The third energization unit 442 projects from the outer surface of the left wall 10B of the heating cooking chamber 10. The third energization unit 442 energizes the heating cooking heater unit 441. The energized heating cooking heater unit 441 generates and radiates heat. The heating cooking heater unit 441 is, for example, a U-shaped sheathed heater.

The right wall 10A includes a plurality of air supply hole portions 10A1. The plurality of air supply hole portions 10A1 pass through the right wall 10A. The left wall 10B includes a plurality of exhaust hole portions 10B1. The plurality of exhaust hole portions 10B1 pass through the left wall 10B.

The damper unit 45 opens or closes the plurality of air supply hole portions 10A1 and the plurality of exhaust hole portions 10B1. For example, when the damper unit 45 opens the plurality of air supply hole portions 10A1 and the plurality of exhaust hole portions 10B1, the accommodation space 1A communicates with the space R. When the damper unit 45 closes the plurality of air supply hole portions 10A1 and the plurality of exhaust hole portions 10B1, the accommodation space 1A does not communicate with the space R. The damper unit 45 includes an air supply damper 45$a$ and an exhaust damper 45$b$.

The air supply damper 45$a$ opens or closes the plurality of air supply hole portions 10A1. The air supply damper 45$a$ is attached to the outer side of the right wall 10A.

The exhaust damper 45$b$ opens or closes the plurality of exhaust hole portions 10B1. The exhaust damper 45$b$ is attached to the outer side of the left wall 10B. As illustrated in FIG. 4, the exhaust damper 45$b$ includes a humidity sensor 45$b$1. The humidity sensor 45$b$1 detects the amount of vapor included in the air discharged from the accommodation space 1A through the plurality of exhaust hole portions 10B1 when the plurality of exhaust hole portions 10B1 are opened. Accordingly, when the microwave heating mode is executed, the heating cooking apparatus 1 can detect a finish of the object to be heated that has been heated and cooked based on the amount of vapor detected by the humidity sensor 45$b$1. The exhaust damper 45$b$ guides the air discharged from the accommodation space 1A through the plurality of exhaust hole portions 10B1 to the exhaust hole portion 11BB (see FIG. 6) without bringing the air into contact with the air in the space R.

The temperature of the outer surface of the heating cooking chamber 10 tends to become high as the temperature inside the accommodation space 1A rises due to the drive of the first air sending unit 41, the second air sending unit 42, or the grill unit 44. The pair of left and right support portions 20, the pair of left and right slide rails 30, and the pair of left and right slide members 133 are made of a metal. The heat from the outer surface of the heating cooking chamber 10 is easily to be heat-transferred to the pair of left and right support portions 20, the pair of left and right slide rails 30, and the pair of left and right slide members 133. Thus, the temperature of the pair of left and right support portions 20, the pair of left and right slide rails 30, and the pair of left and right slide members 133 become high as the temperature inside the accommodation space 1A rises.

Figure 9:
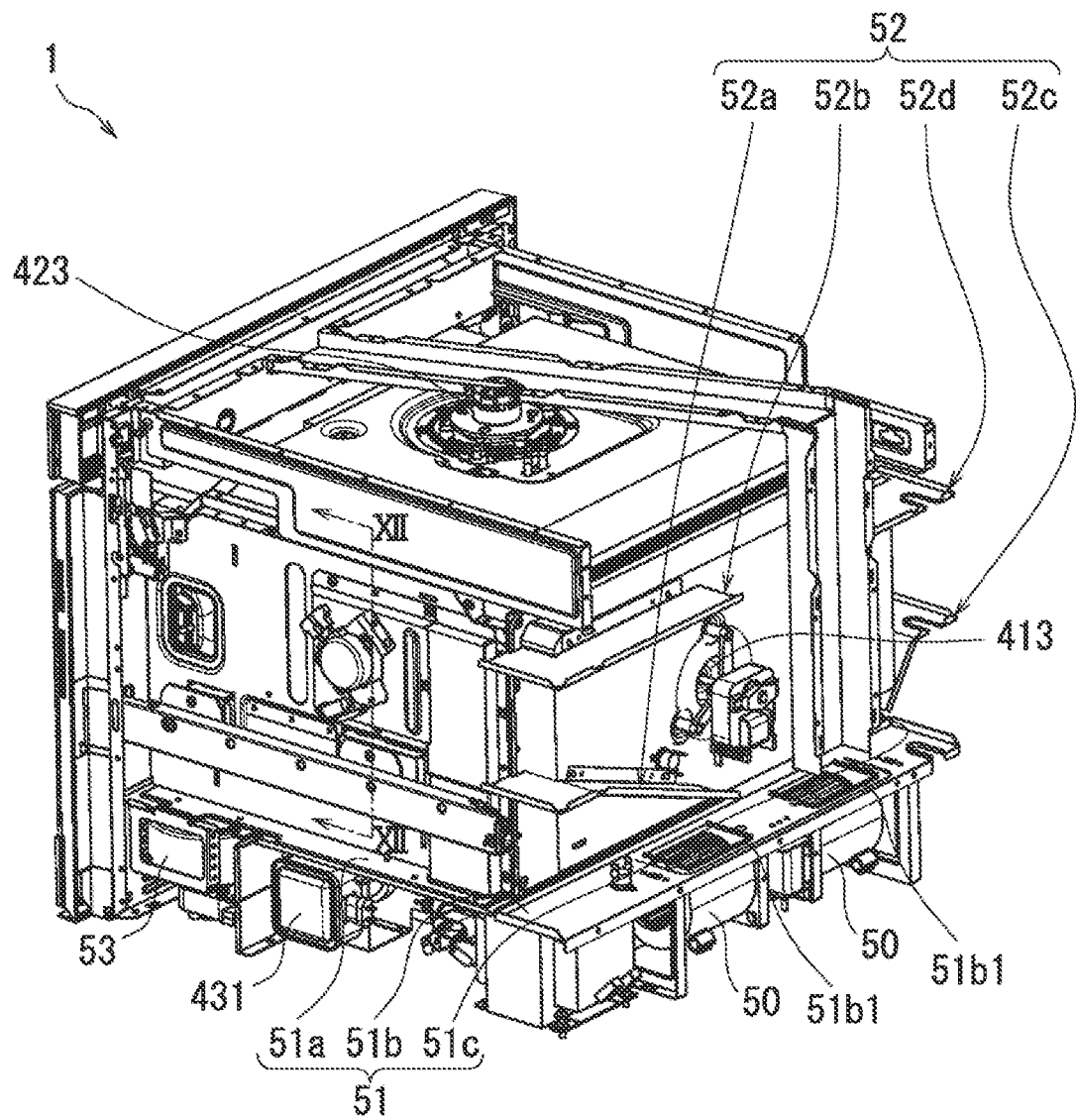
FIG. 9 is a perspective view of the heating cooking apparatus according to the embodiment of the present invention.
Figure 9:
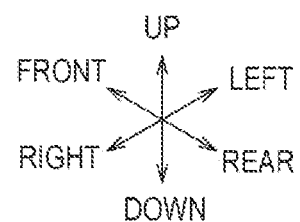
Figure 10:
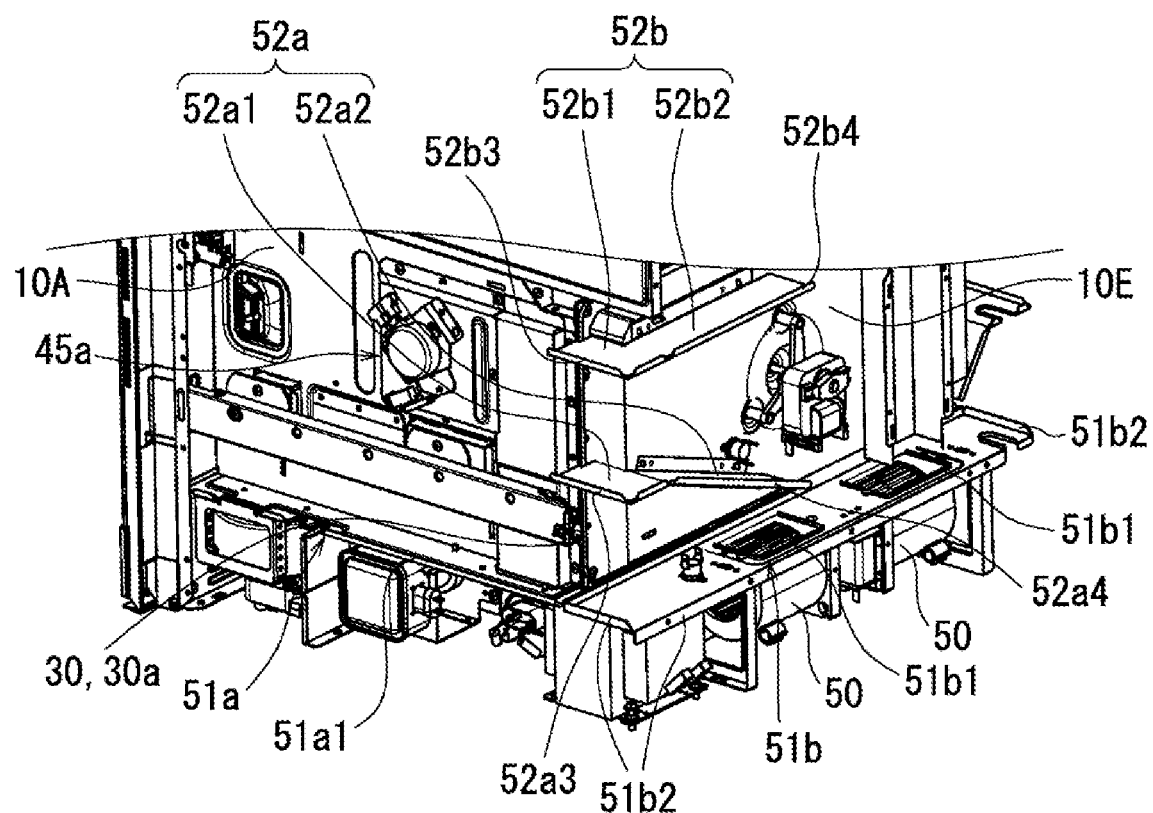
FIG. 10 is a partially enlarged perspective view illustrating the heating cooking apparatus illustrated in FIG. 9.
Figure 11:
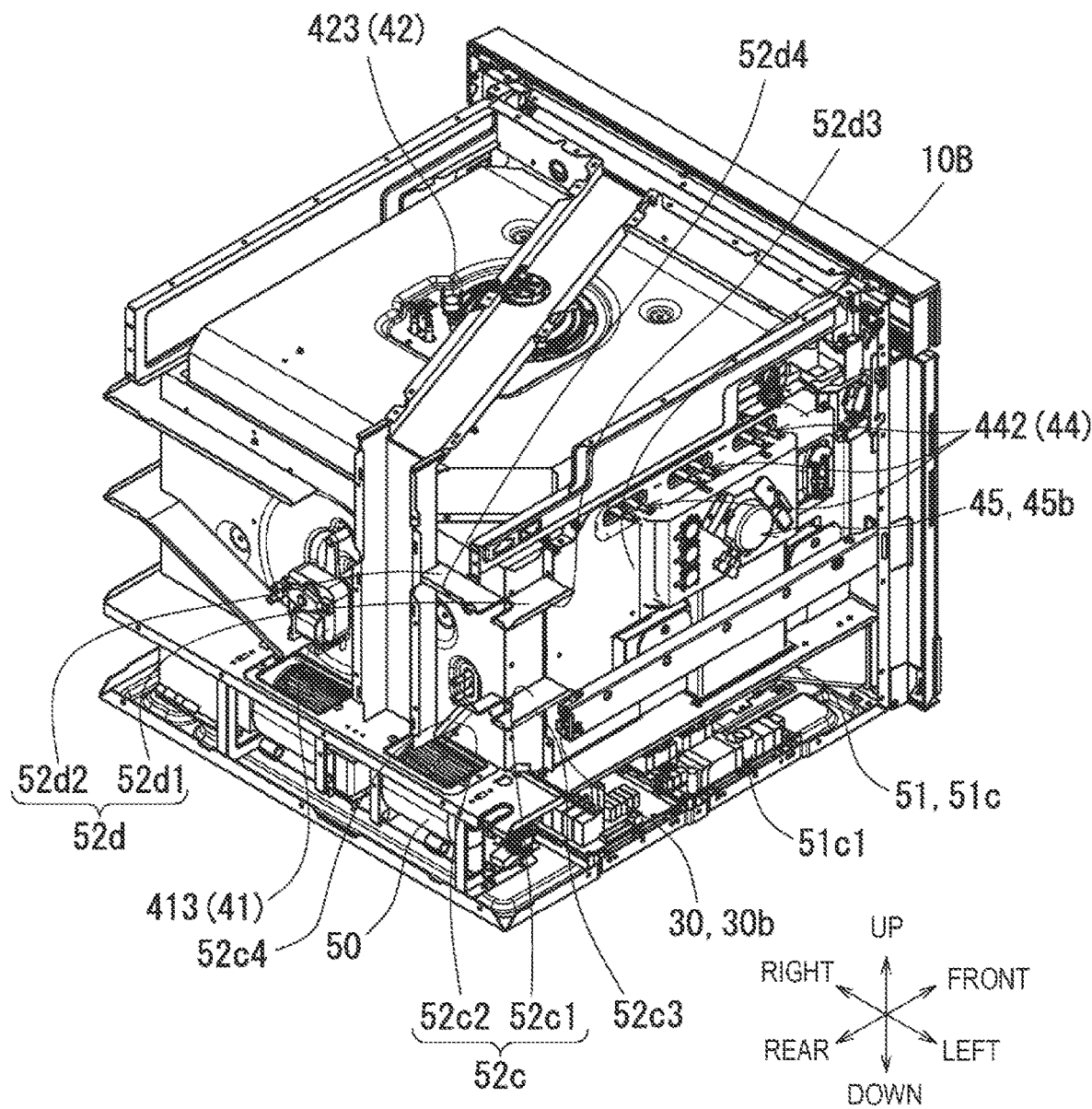
FIG. 11 is a perspective view of the heating cooking apparatus according to the embodiment of the present invention.

Next, the configuration of the heating cooking apparatus 1 will be further described with reference to FIG. 9 to FIG. 12. FIG. 9 is a perspective view of the heating cooking apparatus 1 according to the present embodiment. More specifically, FIG. 9 illustrates the heating cooking apparatus 1 in a state where the housing 14 is removed, in an upper right diagonal direction from behind. FIG. 10 is a partially enlarged perspective view illustrating the heating cooking apparatus 1 illustrated in FIG. 9. More specifically, FIG. 10 illustrates a portion below the center portion of the heating cooking apparatus 1. FIG. 11 is a perspective view of the heating cooking apparatus 1 according to the present embodiment. More specifically, FIG. 11 illustrates the heating cooking apparatus 1 in a state where the housing 14 is removed, in an upper left diagonal direction from behind.

As illustrated in FIG. 9, the heating cooking apparatus 1 further includes a cooling fan 50, a partition plate 51, a plurality of air deflecting plates 52, and a magnetron fan 53. The cooling fan 50, the partition plate 51, the plurality of air deflecting plates 52, and the magnetron fan 53 are located in the space R (see FIG. 7). The cooling fan 50 is an example of a fan.

The cooling fan 50 mainly cools components to be cooled that are disposed around the outer surface of the heating cooking chamber 10 (see FIG. 7). The components to be cooled include the pair of left and right slide members 133, the pair of left and right in-chamber light components 15, the pair of left and right latch switches 16, the pair of left and right support portions 20, the pair of left and right slide rails 30, the first air sending unit 41, the second air sending unit 42, and the grill unit 44. More specifically, the cooling fan 50 takes air outside of the heating cooking apparatus 1 into the space R see FIG. 7) and discharges air in the space R (see FIG. 7) to the outside of the heating cooking apparatus 1. As illustrated in FIG. 9, the cooling fan 50 is located at a lower and rear portion of the space R (see FIG. 7). The cooling fan 50 is located at the same height as the height of the air intake hole portion 11BA (see FIG. 6) of the panel 11. The cooling fan 50 blows out air in an upward direction to generate a blown air flow BF. In the present embodiment, the cooling fan 50 is a cross-flow fan.

As illustrated in FIG. 8, the partition plate 51 partitions the space R into an air intake space AR and an exhaust space BR. The air intake space AR is located below the partition plate 51 in the space R in the up-down direction. The exhaust space BR is located above the partition plate 51 in the space R in the up-down direction. In the air intake space AR, an intake air flow AF generated by the drive of the cooling fan 50 flows. The intake air flow AF indicates a flow of air that flows from the outside of the heating cooking apparatus 1 toward the cooling fan 50 through the plurality of air intake hole portions 11BA (FIG. 6). In the exhaust space BR, the blown air flow BF generated by the drive of the cooling fan 50 flows. As illustrated in FIG. 9 and FIG. 10, the partition plate 51 includes two blow-out hole portions 51$b$1. The blown air flow BF is blown upward from the cooling fan 50 through two blow-out hole portions 51b1 of the partition plate 51 and indicates a flow of air toward the exhaust hole portion 11C (see FIG. 6).

The partition plate 51 is located at a portion above the cooling fan 50 in the space R and a portion below the pair of left and right slide rails 30. The partition plate 51 is attached to the outer surface of the heating cooking chamber 10 across a front end portion of the right wall 10A of the heating cooking chamber 10 to a front end portion of the left wall 10B of the heating cooking chamber 10.

In the present embodiment, the magnetron 431 of the microwave supply unit 43 is located in the air intake space AR. The pair of left and right slide rails 30), the first air sending unit 41, the second air sending unit 42, and the third energization unit 442 of the grill unit 44 are located in the exhaust space BR. Thus, the temperature of air in the exhaust space BR tends to become higher than the temperature of air in the air intake space AR due to the drive of the heating cooking apparatus 1.

As illustrated in FIG. 9, the partition plate 51 includes a first flat plate portion 51a, a second flat plate portion 51b, and a third flat plate portion 51c. The first flat plate portion 51a and the second flat plate portion 51b are connected to each other. The second flat plate portion 51b and the third flat plate portion 51c are connected to each other.

As illustrated in FIG. 10, the first flat plate portion 51a is a flat plate-like object with the front-rear direction as a longitudinal direction. The first flat plate portion 51a is attached to an outer surface of the right wall 10A of the heating cooking chamber 10. The first flat plate portion 51a is located below the right slide rail 30a. The first flat plate portion 51a includes a bent portion 51a1. The bent portion 51a1 is formed at a right edge portion of the first flat plate portion 51a. The bent portion 51a1 is in contact with an inner surface of the right wall 14A (see FIG. 1 and FIG. 2) of the housing 14.

The second flat plate portion 51b is a flat plate-like object with the left-right direction as a longitudinal direction. The second flat plate portion 51b is attached to an outer surface of the rear wall 10E of the heating cooking chamber 10. The second flat plate portion 51b is located above the cooling fan 50. The second flat plate portion 51b includes bent portions 51b2 in addition to the two blow-out hole portions 51b1. Air blown out by the cooling fan 50 is introduced into the exhaust space BR (see FIG. 8) through the two blow-out hole portions 51b1. The bent portions 51b2 are formed at a right edge portion, a left edge portion, and a rear edge portion of the second flat plate portion 51b. The bent portions 51b2 are in contact with inner surfaces of the right wall 14A, the left wall 14B, and the rear wall 14E (see FIG. 1 and FIG. 2) of the housing 14.

As illustrated in FIG. 11, the third flat plate portion 51c is a flat plate-like object with the front-rear direction as a longitudinal direction. The third flat plate portion 51c is attached to an outer surface of the left wall 10B of the heating cooking chamber 10. The third flat plate portion 51c is located below the left slide rail 30b. The third flat plate portion 51c includes a bent portion 51c1. The bent portion 51c1 is formed at a left edge portion of the third flat plate portion 51c. The bent portion 51c1 is in contact with an inner surface of the left wall 14B (see FIG. 1 and FIG. 2) of the housing 14.

As illustrated in FIG. 9, the plurality of air deflecting plates 52 branch the blown air flow BF that is blown out by the cooling fan 50 in an upward direction, guide the blown air flow BF to the components to be cooled, and split the blown air flow BF into an airflow sufficient to cool each of the components to be cooled. More specifically, the plurality of air deflecting plates 52 function as a duct that branches part of the blown air flow BF into five air flows. The plurality of air deflecting plates 52 are attached to an outer surface of the rear wall 10E of the heating cooking chamber 10. The plurality of air deflecting plates 52 include a first air deflecting plate 52a, a second air deflecting plate 52b, a third air deflecting plate 52c, and a fourth air deflecting plate 52d. The first air deflecting plate 52a and the third air deflecting plate 52c are examples of guide portions.

The first air deflecting plate 52a guides part of the blown air flow BF blown out by the cooling fan 50 in the upward direction to the right slide rail 30a, and splits the blown air flow BF into an airflow sufficient to cool the right slide rail 30a. Accordingly, the first air deflecting plate 52a functions as an air deflecting plate for the right slide rail. As illustrated in FIG. 10, the first air deflecting plate 52a includes a first flat plate portion 52a1 and a second flat plate portion 52a2. The first flat plate portion 52a1 and the second flat plate portion 52a2 are connected to each other.

The first flat plate portion 52a1 is a flat plate-like object with the front-rear direction as a longitudinal direction. The first flat plate portion 52a1 is located above the right slide rail 30a and below the air supply damper 45a. The lower surface of the first flat plate portion 52a1 extends in the front-rear direction. The front-rear direction indicates a slide direction in which the pull-out body 13 described with reference to FIG. 3 and FIG. 4 slides. The first flat plate portion 52a1 includes bent portions 52a3. The bent portions 52a3 are formed at a rear edge portion and a right edge portion of the first flat plate portion 52a1. The bent portions 52a3 are in contact with an inner surface of the right wall 14A and the rear wall 14E (see FIG. 1 and FIG. 2) of the housing 14. The lower surface of the first flat plate portion 52a1 is an example of a guide surface.

The second flat plate portion 52a2 is a flat plate-like object with a diagonally rightward direction (upper-right-to-lower-left direction) as a longitudinal direction. The second flat plate portion 52a2 includes a bent portion 52a4. The bent portion 52a4 is formed at a rear edge portion of the second flat plate portion 52a2, The bent portion 52a4 is in contact with the inner surface of the rear wall 14E (see FIG. 1 and FIG. 2) of the housing 14.

The second air deflecting plate 52b guides part of the blown air flow BF blown out by the cooling fan 50 in the upward direction to the air supply damper 45a, Accordingly, the second air deflecting plate 52b functions as an air deflecting plate for the air supply damper. The second air deflecting plate 52b includes a first flat plate portion 52b1 and a second flat plate portion 52b2. The first flat plate portion 52b1 and the second flat plate portion 52b2 are connected to each other.

The first flat plate portion 52b1 is a flat plate-like object with the front-rear direction as a longitudinal direction. The first flat plate portion 52b1 is located above the air supply damper 45a. The first flat plate portion 52h1 includes bent portions 52b3. The bent portions 52b3 are formed at a rear edge portion and a right edge portion of the first flat plate portion 52b1. The bent portions 52b3 are in contact with the inner surface of the right wall 14A and the rear wall 14E (see FIG. 1 and FIG. 2) of the housing 14.

The second flat plate portion 52b2 is a flat plate-like object with the left-right direction as a longitudinal direction. The second flat plate portion 52b2 includes a bent portion 52b4. The bent portion 52b4 is formed at a rear edge portion of the second flat plate portion 52b2. The bent portion 52*b*4 is in contact with the inner surface of the rear wall 14E (see FIG. 1 and FIG. 2) of the housing 14.

As illustrated in FIG. 11, the third air deflecting plate 52*c* guides part of the blown air flow BE blown out by the cooling fan 50 in the upward direction to the left slide rail 30*b*, and splits the blown air flow BE into an airflow sufficient to cool the left slide rail 30*b*. Accordingly, the third air deflecting plate 52*c* functions as an air deflecting plate for the left slide rail. The third air deflecting plate 52*c* includes a first flat plate portion 52*c*1 and a second flat plate portion 52*c*2. The first flat plate portion 52*c*1 and the second flat plate portion 52*c*2 are connected to each other.

The first flat plate portion 52*c*1 is a flat plate-like object with the front-rear direction as a longitudinal direction. The first flat plate portion 52*c*1 is located above the left slide rail 30*b* and below the exhaust damper 45*b*. The lower surface of the first flat plate portion 52*c*1 extends in the front-rear direction. The first flat plate portion 52*c*1 includes bent portions 52*c*3. The bent portions 52*c*3 are formed at a rear edge portion and a left edge portion of the first flat plate portion 52*c*1. The bent portions 52*c*3 are in contact with an inner surface of the left wall 14B and the rear wall 14E (see FIG. 1 and FIG. 2) of the housing 14. The lower surface of the first flat plate portion 52*c*1 is an example of a guide surface.

The second flat plate portion 52*c*2 is a flat plate-like object with a diagonally leftward direction (upper-left-to-lower-right directions as a longitudinal direction. The second flat plate portion 52*c*2 includes a bent portion 52*c*4. The bent portion 52*c*4 is formed at a rear edge portion of the second flat plate portion 52*c*2. The bent portion 52*c*4 is in contact with the inner surface of the rear wall 14E (see FIG. 1 and FIG. 2) of the housing 14.

The fourth air deflecting plate 52*d* guides part of the blown air flow BF blown out by the cooling fan 50 in the upward direction to the third energization unit 442 of the grill unit 44. Accordingly, the fourth air deflecting plate 52*d* functions as an air deflecting plate for the grill unit. The fourth air deflecting plate 52*d* includes a first flat plate portion 52*d*1 and a second flat plate portion 52*d*2. The first flat plate portion 52*d*1 and the second flat plate portion 52*d*2 are connected to each other.

The first flat plate portion 52*d*1 is a flat plate-like object with the front-rear direction as a longitudinal direction. The first flat plate portion 52*d*1 is located below the third energization unit 442 of the grill unit 44. The first flat plate portion 52*d*1 includes bent portions 52*d*3. The bent portions 52*d*3 are formed at a rear edge portion and a left edge portion of the first flat plate portion 52*d*1. The bent portions 52*d*3 are in contact with an inner surface of the left wall 14B and the rear wall 14E (see FIG. 1 and FIG. 2) of the housing 14.

The second flat plate portion 52*d*2 is a flat plate-like object with the left-right direction as a longitudinal direction. The second flat plate portion 52*d*2 includes a bent portion 52*d*4. The bent portion 52*d*4 is formed at a rear edge portion of the second flat plate portion 52*d*2. The bent portion 52*d*4 is in contact with the inner surface of the rear wall 14E (see FIG. 1 and FIG. 2) of the housing 14.

As illustrated in FIG. 9, the magnetron fan 53 cools the magnetron 431 of the microwave supply unit 43. More specifically, the magnetron fan 53 suctions air Outside of the heating cooking apparatus 1 through the plurality of air intake hole portions 11BA described with reference to FIG. 6 and blows the air onto the magnetron 431. The operation characteristics of the magnetron 431 depend on the temperature of the magnetron 431. Thus, the magnetron fan 53 inhibits fluctuations in the operation characteristics of the magnetron 431. The magnetron fan 53 is located below the heating cooking chamber 10 and in front of the magnetron 431. The magnetron fan 53 is, for example, a sirocco fan.

Figure 12:
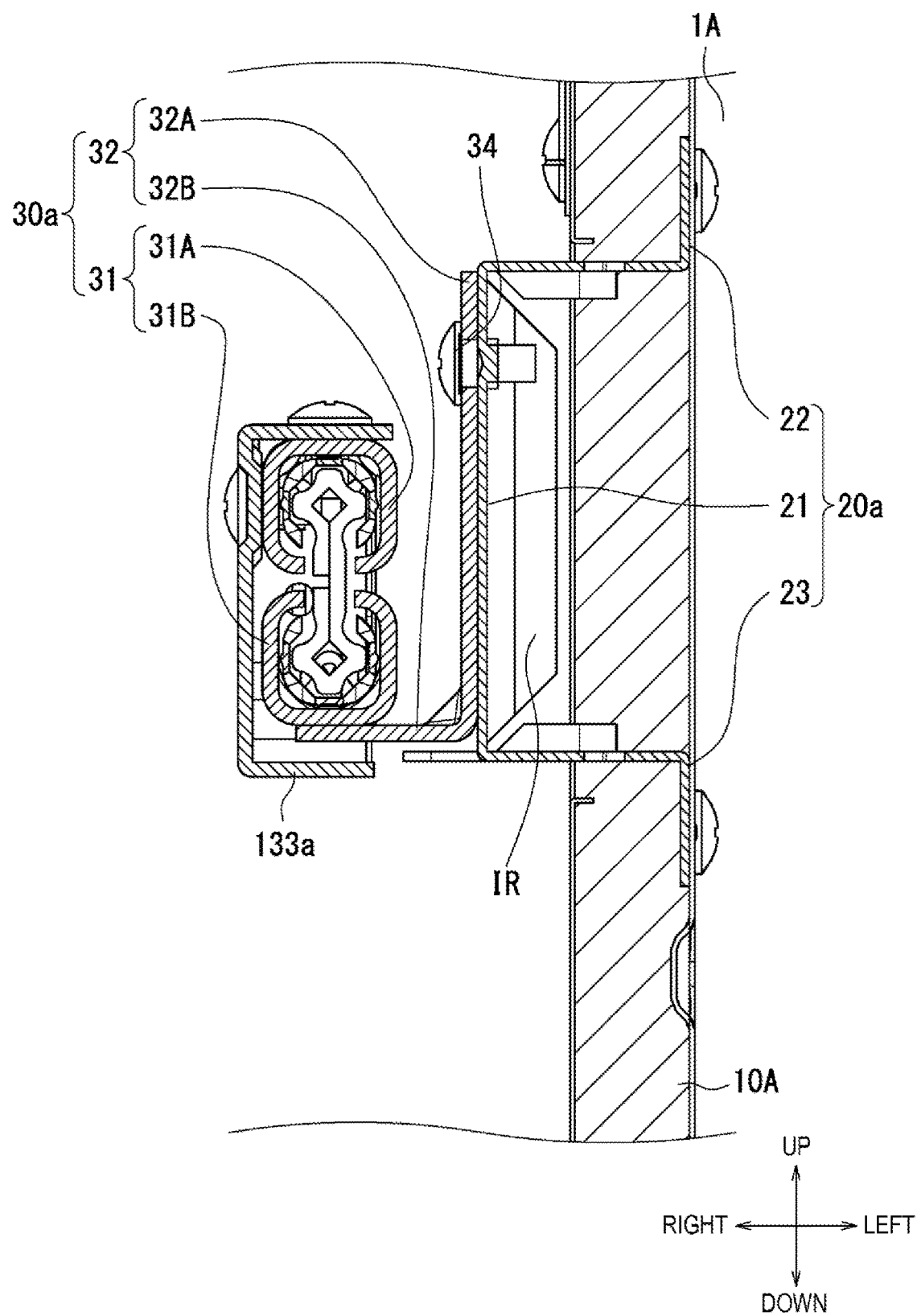
FIG. 12 is a partial cross-sectional view of a heating cooking apparatus 1 along a section line XII in FIG. 9.
Figure 13:
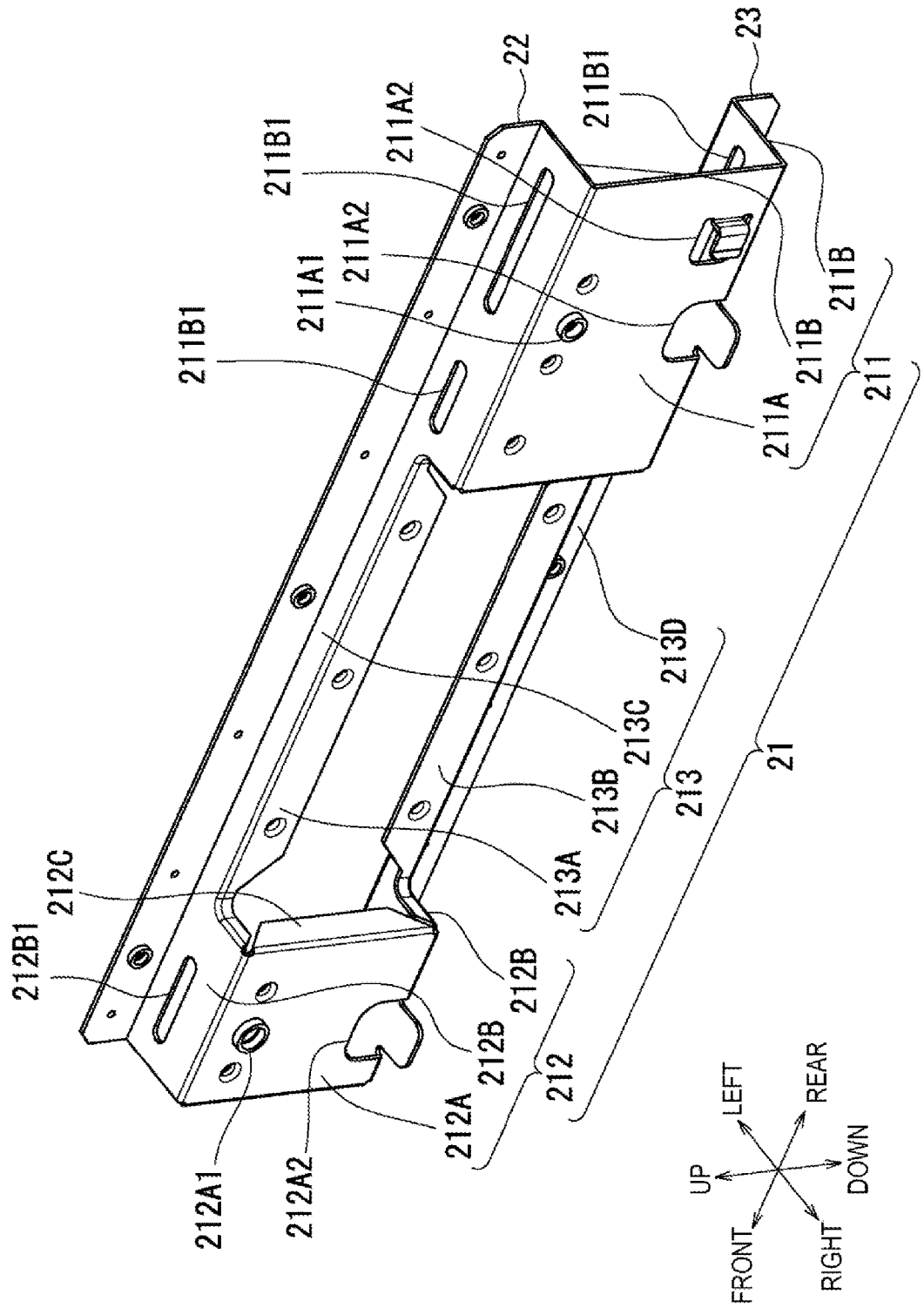
FIG. 13 is a perspective view of a right support portion according to the embodiment of the present invention.
Figure 14:
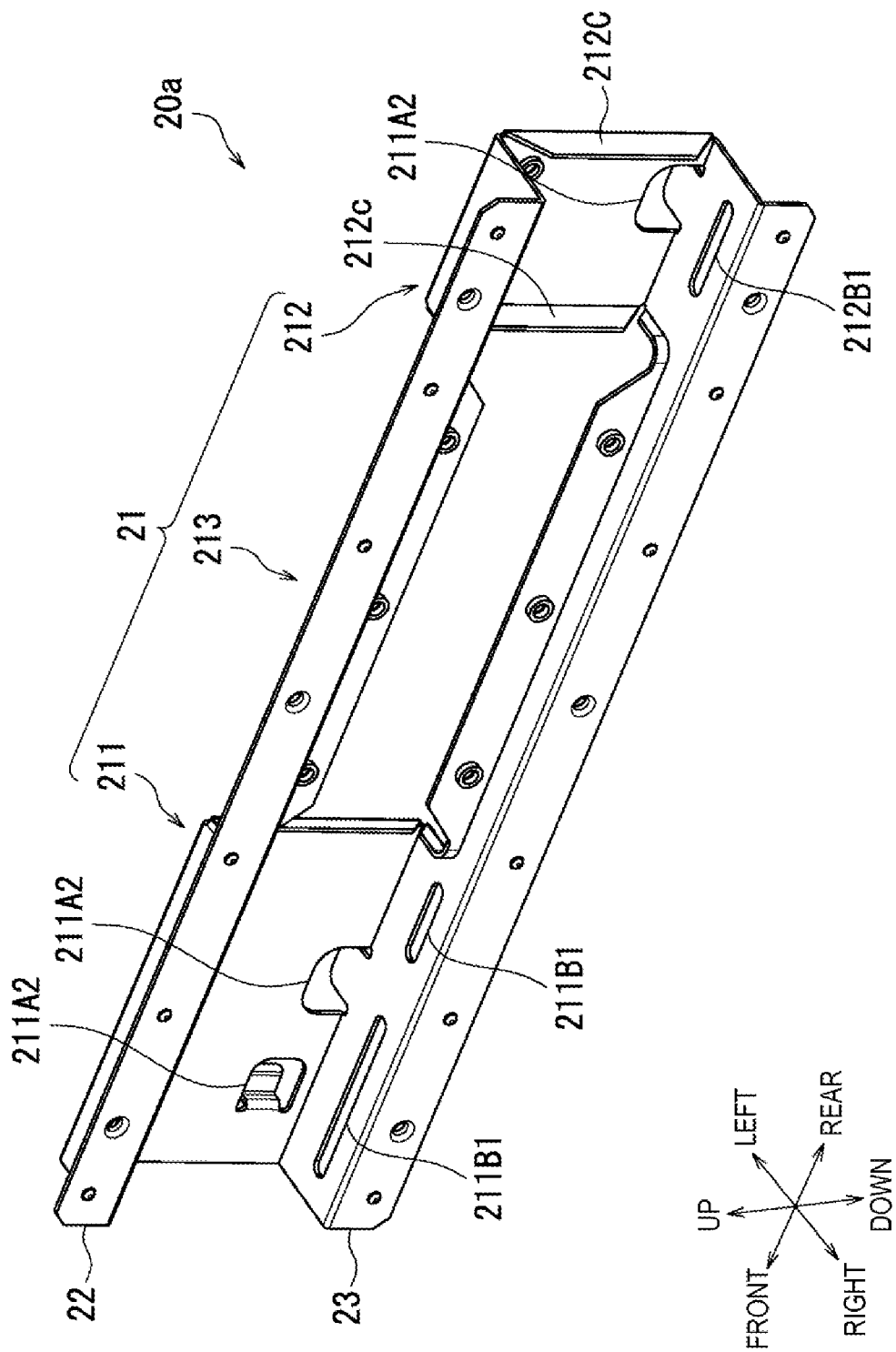
FIG. 14 is a perspective view of the right support portion according to the embodiment of the present invention.

Next, the configuration of the right support portion 20*a* will be further described with reference to FIG. 12 to FIG. 14. FIG. 12 is a partial cross-sectional view of the heating cooking apparatus 1 along a section line XII in FIG. 9. Specifically, FIG. 12 illustrates the cross-sections of the right wall 10A, the right support portion 20*a*, the right slide rail 30*a*, and the right slide member 133*a*. FIG. 13 and FIG. 14 are perspective views of the right support portion 20*a* according to the present embodiment. Specifically, FIG. 13 illustrates the right support portion 20*a* in an upper right diagonal direction from behind. FIG. 14 illustrates the right support portion 20*a* in an upper left diagonal direction from the front.

As illustrated in FIG. 12, the right support portion 20*a* includes a distribution portion 21, a first flange portion 22, and a second flange portion 23. The distribution portion 21, the first flange portion 22, and the second flange portion 23 are integrated. A left portion of the distribution portion 21, the first flange portion 22, and the second flange portion 23 are embedded in the right wall 10A.

The distribution portion 21 and the outer surface of the right wall 10A form an inner space IR therebetween. The blown air flow BF flows in the inner space IR. As illustrated in FIG. 13 and FIG. 14, the distribution portion 21 is a groove-shaped portion having a substantially U-shaped cross-section with the front-rear direction as a longitudinal direction.

As illustrated in FIG. 12, the first flange portion 22 extends upward from a left edge portion of an upper portion of the distribution portion 21. The first flange portion 22 is attached to the right wall 10A. As illustrated in FIG. 13 and FIG. 14, the first flange portion 22 is formed in the front-rear direction of the distribution portion 21.

As illustrated in FIG. 12, the second flange portion 23 extends downward from a left edge portion of a lower portion of the distribution portion 21. The second flange portion 23 is attached to the right wall 10A. As illustrated in FIG. 13 and FIG. 14, the second flange portion 23 is formed in the front-rear direction of the distribution portion 21.

As illustrated in FIG. 13, the distribution portion 21 includes a rear fixing portion 211, a front fixing portion 212, and a notched portion 213 in the front-rear direction. The rear fixing portion 211 is located at a rear portion of the distribution portion 21 in the front-rear direction. The front fixing portion 212 is located at a front portion of the distribution portion 21 in the front-rear direction. The notched portion 213 is located between the rear fixing portion 211 and the front fixing portion 212 of the distribution portion 21 in the front-rear direction.

The rear fixing portion 211 is a portion where a rear attachment support portion 32 of the right slide rail 30*a* to be described below with reference to FIG. 14 is fixed (see FIG. 12). The rear fixing portion 211 includes a rear facing wall 211A and a pair of rear standing walls 211B. One of the pair of rear standing walls 211B is provided to stand leftward from an upper edge portion of the rear facing wall 211A. The other one of the pair of rear standing walls 211B is provided to stand leftward from a lower edge portion of the rear facing wall 211A. The rear facing wall 211A and the pair of rear standing walls 211B are integrated.

Figure 15:
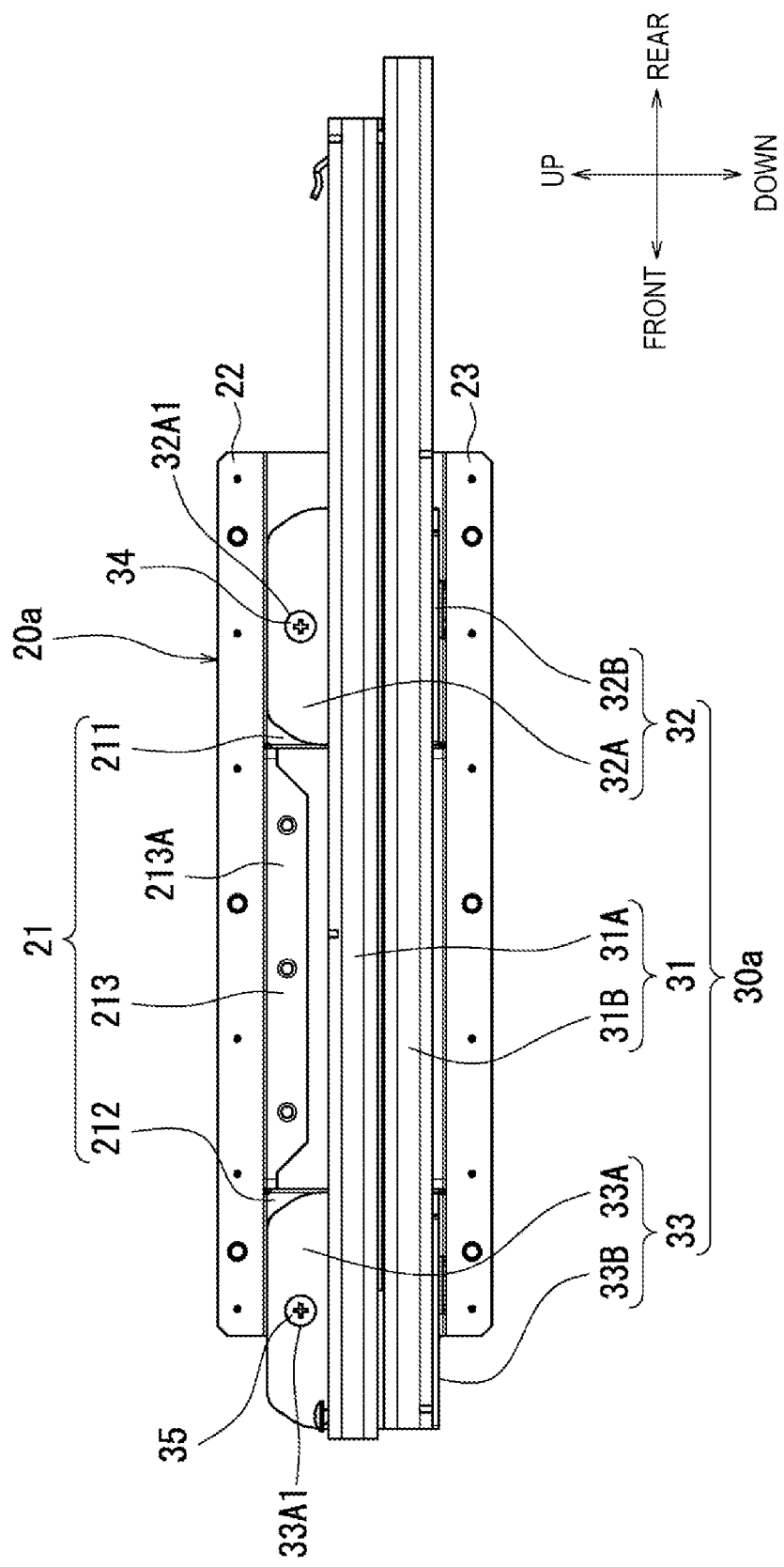
FIG. 15 is a front view of the right support portion to which a right slide rail according to the present embodiment is attached.

The rear facing wall 211A faces the outer surface of the right wall 10A. The rear facing wall 211A is a flat plate-like object. The rear facing wall 211A includes a rear attachment hole portion 211A1 and two ventilation holes 211A2. The rear attachment hole portion 211A1 is a portion where a first screw 34 to be described with reference to FIG. 15 is screwed. The rear attachment hole portion 211A1 is located at the center portion of the rear facing wall 211A in the front-rear direction and an upper portion of the rear facing wall 211A. The two ventilation holes 211A2 are through holes that guide the blown air flow BF flowing through the inner space IR (see FIG. 12) to the outside of the inner space IR (see FIG. 12).

As illustrated in FIG. 13 and FIG. 14, the pair of rear standing walls 211B include a plurality of ventilation holes 211B1. The plurality of ventilation holes 211B1 are through holes that guide the blown air flow BF flowing through the inner space IR (see FIG. 12) to the outside of the inner space IR (see FIG. 12).

The front fixing portion 212 is a portion where the front attachment support portion 33 of the right slide rail 30a to be described below with reference to FIG. 14 is fixed. As illustrated in FIG. 13, the front fixing portion 212 includes a front facing wall 212A, a pair of front standing walls 212B, and a pair of bent portions 212C (see FIG. 13 and FIG. 14). One of the pair of front standing walls 212B (see FIG. 13) is provided to stand leftward from an upper edge portion of the front facing wall 212A. The other one of the pair of front standing walls 212B (see FIG. 14) is provided to stand leftward from a lower edge portion of the front facing wall 212A. One of the pair of bent portions 212C is bent leftward from a rear edge portion of the front facing wall 212A. The other one of the pair of bent portions 2120 is bent leftward from a front edge portion of the front facing wall 212A. The front facing wall 212A, the pair of front standing walls 212B, and the pair of bent portions 212C are integrated.

The front facing wall 212A faces the outer surface of the right wall 10A. The front facing wall 212A is a flat plate-like object. The front facing wall 212A includes a front attachment hole portion 212A1 and a ventilation hole 212A2. The front attachment hole portion 212A1 is a portion where a second screw 35 to be described below with reference to FIG. 15 is screwed. The front attachment hole portion 212A1 is located at the center portion of the front facing wall 212A in the front-rear direction and at an upper portion of the front facing wall 212A. The ventilation hole 212A2 is a through hole that guides the blown air flow BF flowing through the inner space IR (see FIG. 12) to the outside of the inner space IR (see FIG. 12).

As illustrated in FIG. 13 and FIG. 14, a pair of front standing walls 212B include a plurality of ventilation holes 212B1. The plurality of ventilation holes 212B1 are through holes that guide the blown air flow BF flowing through the inner space IR (see FIG. 12) to the outside of the inner space IR (see FIG. 12). In the left-right direction, the height of the pair of front standing walls 212B relative to the front facing wall 212A and the height of the pair of rear standing walls 211B relative to the front facing wall 212A are substantially the same.

In the left-right direction, the height of the pair of bent portions 212C relative to the front facing wall 212A is equal to or less than a half of the height of the pair of front standing walls 212B relative to the front facing wall 212A.

The notched portion 213 makes it easy to bring the blown air flow BF into contact with the right slide rail 30a attached to the right support portion 20a. The notched portion 213 includes an upper attachment piece 213A, a lower attachment piece 213B, and an upper standing wall 213C, and a lower standing wall 213D. Each of the upper attachment piece 213A and the lower attachment piece 213B is attached to the outer surface of the right wall 10A. Each of the upper attachment piece 213A and the lower attachment piece 213B faces the outer surface of the right wall 10A. Each of the upper attachment piece 213A and the lower attachment piece 213B is a plate-like object with the front-rear direction as a longitudinal direction. The upper standing wall 213C is provided to stand leftward from an upper end portion of the upper attachment piece 213A. The lower standing wall 213D is provided to stand leftward from a lower end portion of the lower attachment piece 213B. In the left-right direction, the height of the upper standing wall 213C and the height of the lower standing wall 213D are substantially the same. In the left-right direction, the heights of the upper standing wall 213C and the lower standing wall 213D are lower than the heights of the pair of front standing walls 212B and the pair of rear standing walls 211B.

Next, the configuration of the right slide rail 30a will be further described with reference to FIG. 12 and FIG. 15. FIG. 15 is a front view of the right support portion 20a in which the right slide rail 30a according to the present embodiment is attached. Specifically, FIG. 15 illustrates the right support portion 20a to which the right slide rail 30a is attached, as viewed from the right.

As illustrated in FIG. 15, the right slide rail 30a includes a rail portion 31, a rear attachment support portion 32, and a front attachment support portion 33. The rail portion 31, the rear attachment support portion 32, and the front attachment support portion 33 are integrated.

The rail portion 31 engages with the right slide member 133a described with reference to FIG. 3. The rail portion 31 slidably supports the right slide member 133a. The rail portion 31 includes an upper rail portion 31A and a lower rail portion 31B. The upper rail portion 31A and the lower rail portion 31B are installed side by side in the up-down direction. The upper rail portion 31A and the lower rail portion 31B are rail-shaped objects with the front-rear direction as a longitudinal direction. In the present embodiment, the length of the upper rail portion 31A is shorter than the length of the lower rail portion 31B in the front-rear direction.

As illustrated in FIG. 12, the rear attachment support portion 32 supports the rail portion 31 and is fixed to the rear fixing portion 211 of the right support portion 20a. The rear attachment support portion 32 is a bracket having substantially L-shaped cross-section. The rear attachment support portion 32 includes a rear base plate portion 32A and a rear support plate portion 32B. The rear support plate portion 32B extends rightward from a lower edge portion of the rear base plate portion 32A. The rear base plate portion 32A and the rear support plate portion 32B are integrated.

As illustrated in FIG. 15, the rear base plate portion 32A is a flat plate-like object. The rear base plate portion 32A includes a rear attachment hole portion 32A1 corresponding to the rear attachment hole portion 211A1 (see FIG. 13) of the right support portion 20a. The first screw 34 is screwed into the rear attachment hole portion 211A1 of the right support portion 20a via the rear attachment hole portion 32A1 of the right slide rail 30a, and thus the rear attachment support portion 32 is fixed to the rear facing wall 211A (see FIG. 13).

The rear support plate portion 32B is a flat plate-like object. As illustrated in FIG. 12, the rail portion 31 is placed on the rear support plate portion 32B. The rail portion 31 is fixed to the rear support plate portion 32B.

As illustrated in FIG. 15, similarly to the rear attachment support portion 32, the front attachment support portion 33 supports the rail portion 31 and is fixed to the front fixing portion 212 (see FIG. 13) of the right support portion 20a.

The front attachment support portion 33 is a bracket having substantially L-shaped cross-section. The front attachment support portion 33 includes a front base plate portion 33A and a front support plate portion 33B. The front support plate portion 33B extends rightward from a lower edge portion of the front base plate portion 33A. The front base plate portion 33A and the front support plate portion 33B are integrated.

The front base plate portion 33A is a flat plate-like object. The front base plate portion 33A includes a front attachment hole portion 33A1 corresponding to the front attachment hole portion 212A1 (see FIG. 13) of the right support portion 20a. The second screw 35 is screwed into the front attachment hole portion 212A1 of the right support portion 20a via the front attachment hole portion 33A1 of the right slide rail 30a, and thus the front attachment support portion 33 is fixed to the front facing wall 212A (see FIG. 13).

The front support plate portion 33B is a flat plate-like object. The rail portion 31 is placed on the front support plate portion 33B. The rail portion 31 is fixed to the front support plate portion 33B.

Figure 16:
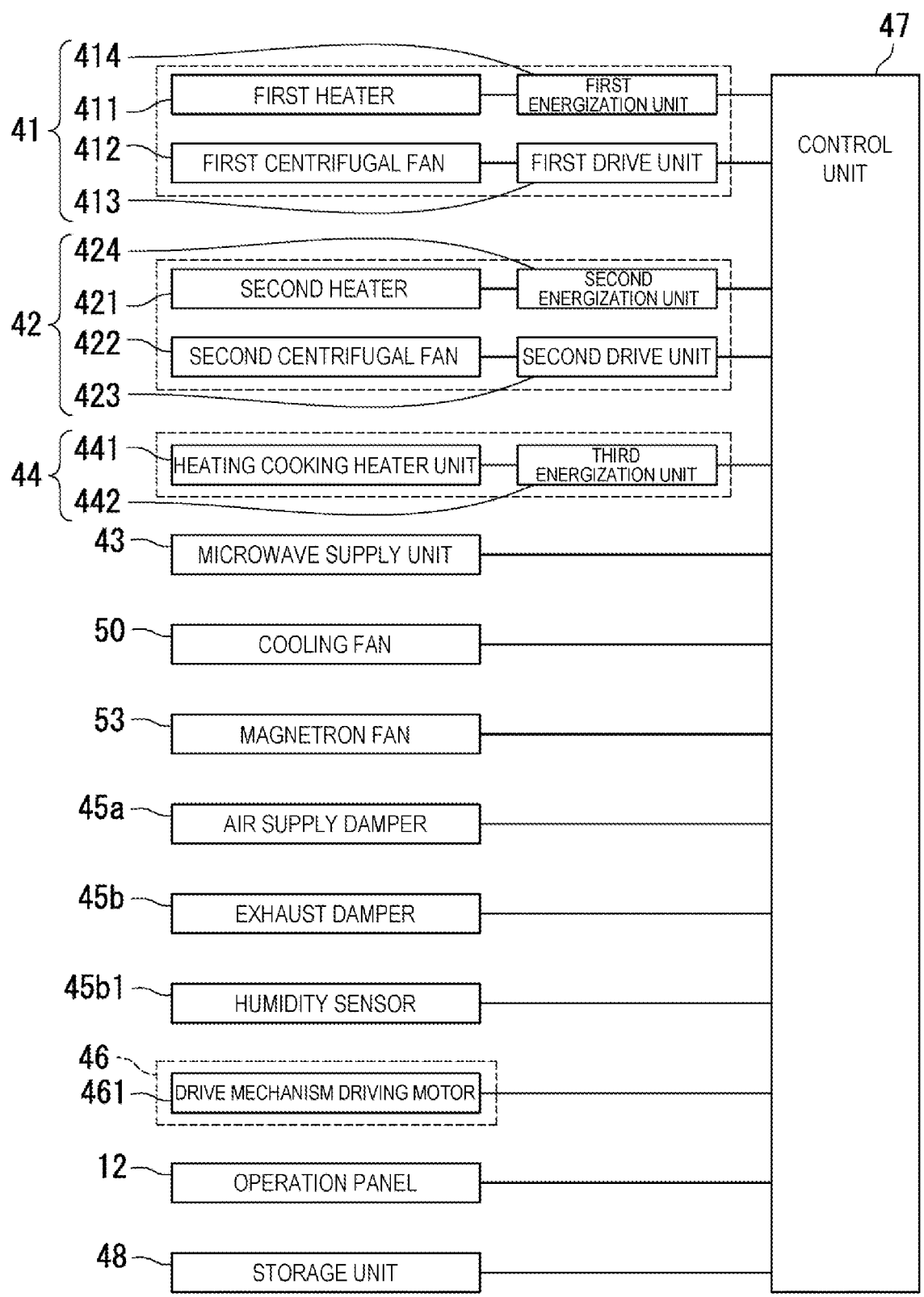
FIG. 16 is a block diagram illustrating a configuration of the heating cooking apparatus according to the embodiment of the present invention.

The configuration of the heating cooking apparatus 1 will be further described with reference to FIG. 16. FIG. 16 is a block diagram illustrating the configuration of the heating cooking apparatus 1 according to the present embodiment.

As illustrated in FIG. 16, the heating cooking apparatus 1 further includes a drive mechanism 46 and a storage unit 48.

The drive mechanism 46 includes a drive mechanism driving motor 461 and a rack pinion mechanism. The rack pinion mechanism includes a pinion. The pinion is attached to a tip end portion of a motor shaft of the drive mechanism driving motor 461. The pinion engages with the rack portion of the support member 134 described with reference to FIG. 3 and FIG. 4.

The storage unit 48 includes a Random Access Memory (RAM) and a Read Only Memory (ROM). The storage unit 48 stores control programs used for controlling the operation of each portion of the heating cooking apparatus 1. The storage unit 48 stores setting information input by operating the operation panel unit 12.

The control unit 47 is a hardware circuit. The hardware circuit includes a processor such as a Central Processing Unit (CPU). The control unit 47 executes control programs stored in the storage unit 48 to thereby control the operation panel unit 12, the first drive unit 413, the first energization unit 414, the second drive unit 423, the second energization unit 424, the third energization unit 442, the microwave supply unit 43, the air supply damper 45a, the exhaust damper 45b, the cooling fan 50, the magnetron fan 53, the drive mechanism driving motor 461, and the storage unit 48.

The control unit 47 controls the drive of the cooling fan 50 and the magnetron fan 53 according to the type of heating cooking mode received by the operation panel unit 12. When being operated by a user, the operation panel unit 12 receives a command to set any one of heating cooking mode among the microwave heating mode, the first hot air circulation heating mode, the second hot air circulation heating mode, and the grill heating mode. The control unit 47 sets the heating cooking mode according to the command received by the operation panel unit 12. For example, when the control unit 47 sets the first hot air circulation heating mode, the second hot air circulation heating mode, or the grill heating mode as the heating cooking mode, the control unit 47 drives the cooling fan 50. In this case, the control unit 47 does not drive the magnetron fan 53. When the control unit 47 sets the microwave heating mode as the heating cooking mode, for example, the control unit 47 drives the cooling fan 50 and the magnetron fan 53.

The control unit 47 controls the air supply damper 45a and the exhaust damper 45b according to the type of heating cooking mode received by the operation panel unit 12. More specifically, when the control unit 47 sets the first hot air circulation heating mode, the second hot air circulation heating mode, or the grill heating mode as the heating cooking mode, the control unit 47 causes the air supply damper 45a and the exhaust damper 45b to close the air supply hole portions 10A1 and the exhaust hole portions 10B1, respectively. In this manner, when the first hot air circulation heating mode, the second hot air circulation heating mode, or the grill heating mode is executed, the accommodation space 1A is closed. As a result, the temperature inside the accommodation space 1A is maintained.

When the control unit 47 sets the microwave heating mode as the heating cooking mode, the control unit 47 causes the air supply damper 45a and the exhaust damper 45b to open the air supply hole portions 10A1 and the exhaust hole portions 10B1, respectively. In this manner, when the microwave heating mode is executed, the accommodation space 1A is opened. As a result, the damper unit 45 can detect a finish of the object to be heated that has been heated and cooked.

More specifically, when the microwave heating mode is executed, water vapor emitted from the object to be heated in the accommodation space 1A travels from the accommodation space 1A into the exhaust damper 45b. The humidity sensor 45b1 detects an amount of vapor in the exhaust damper 45b. The amount of vapor in the exhaust damper 45b depends on the temperature of the object to be heated that has been heated and cooked. The control unit 47 determines whether the amount of vapor detected by the humidity sensor 45b1 is equal to or more than a predetermined value. The predetermined value indicates an amount of vapor that corresponds to a desired finishing temperature of the object to be heated. When the control unit 47 determines that the amount of vapor detected by the humidity sensor 45b1 is equal to or more than the predetermined value, the control unit 47 terminates the drive of the microwave supply unit 43. When the control unit 47 determines that the amount of vapor detected by the humidity sensor 45b1 is not equal to or more than the predetermined value, the control unit 47 does not terminate the drive of the microwave supply unit 43. The storage unit 48 stores the predetermined value. The air inside the exhaust damper 45b is discharged to the outside of the heating cooking apparatus 1 through the exhaust hole portion 11BB described with reference to FIG. 6.

Figure 17:
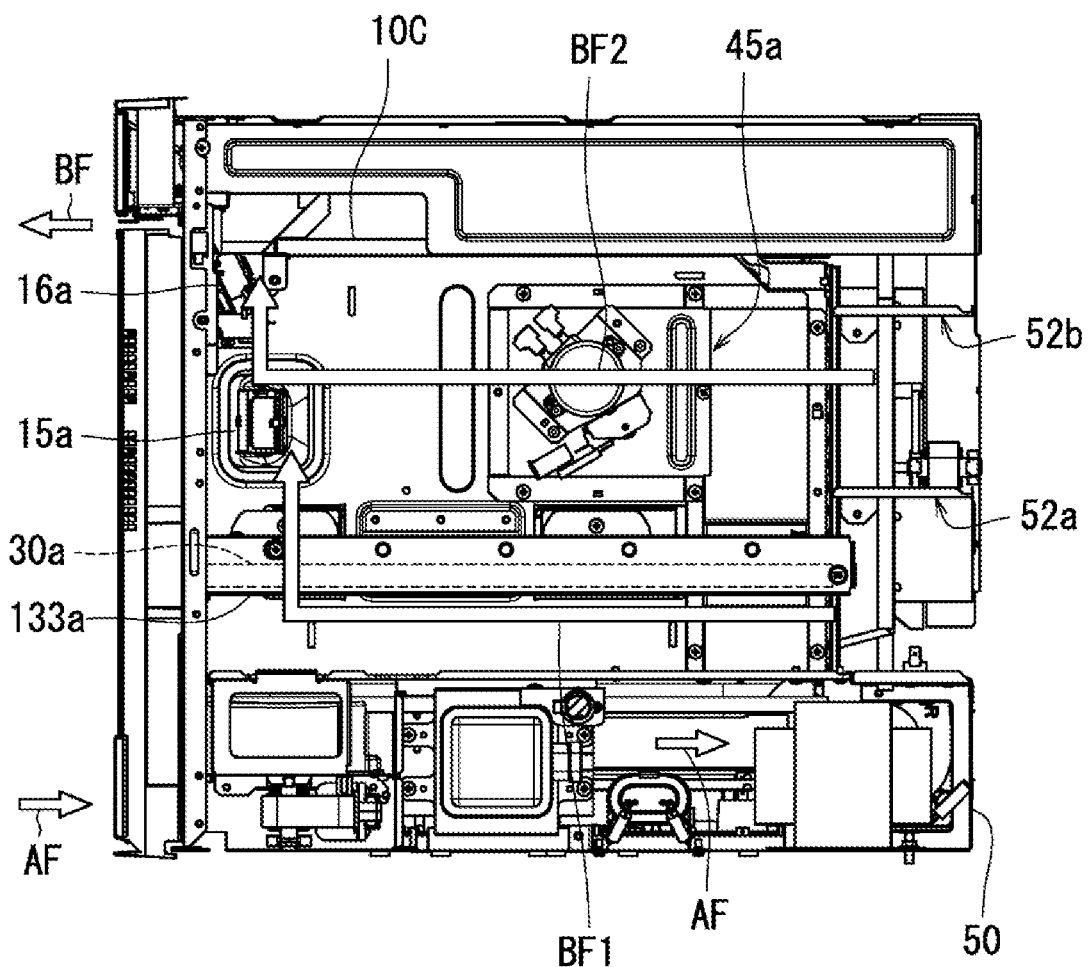
FIG. 17 is a diagram illustrating a right side surface of the heating cooking apparatus according to the embodiment of the present invention.
Figure 17:
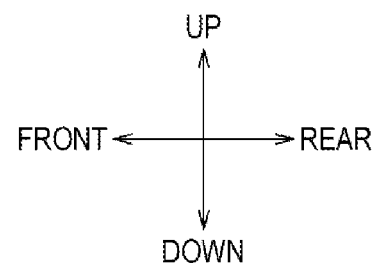
Figure 18:
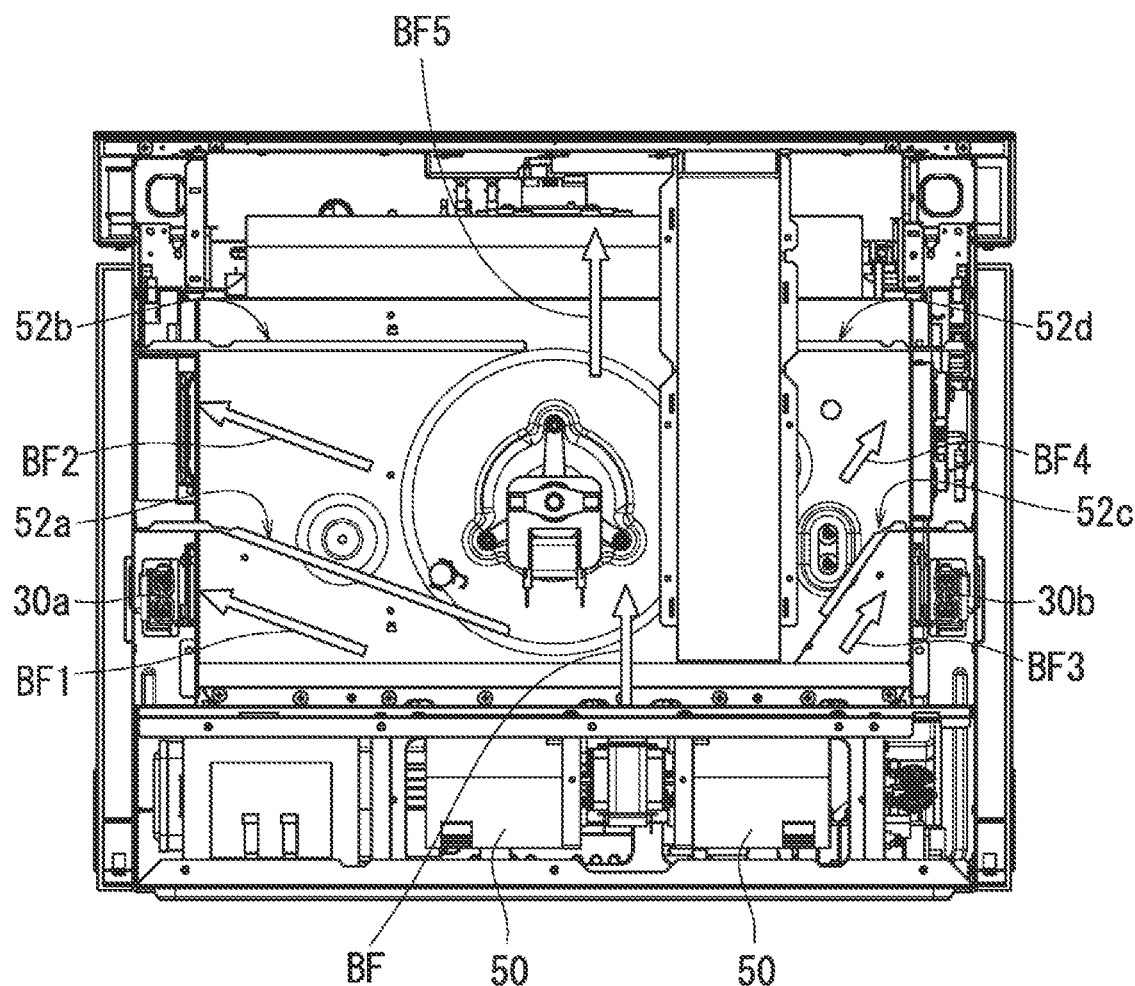
FIG. 18 is a diagram illustrating a back surface of the heating cooking apparatus according to the embodiment of the present invention.
Figure 18:
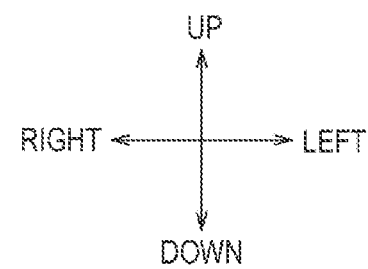
Figure 19:
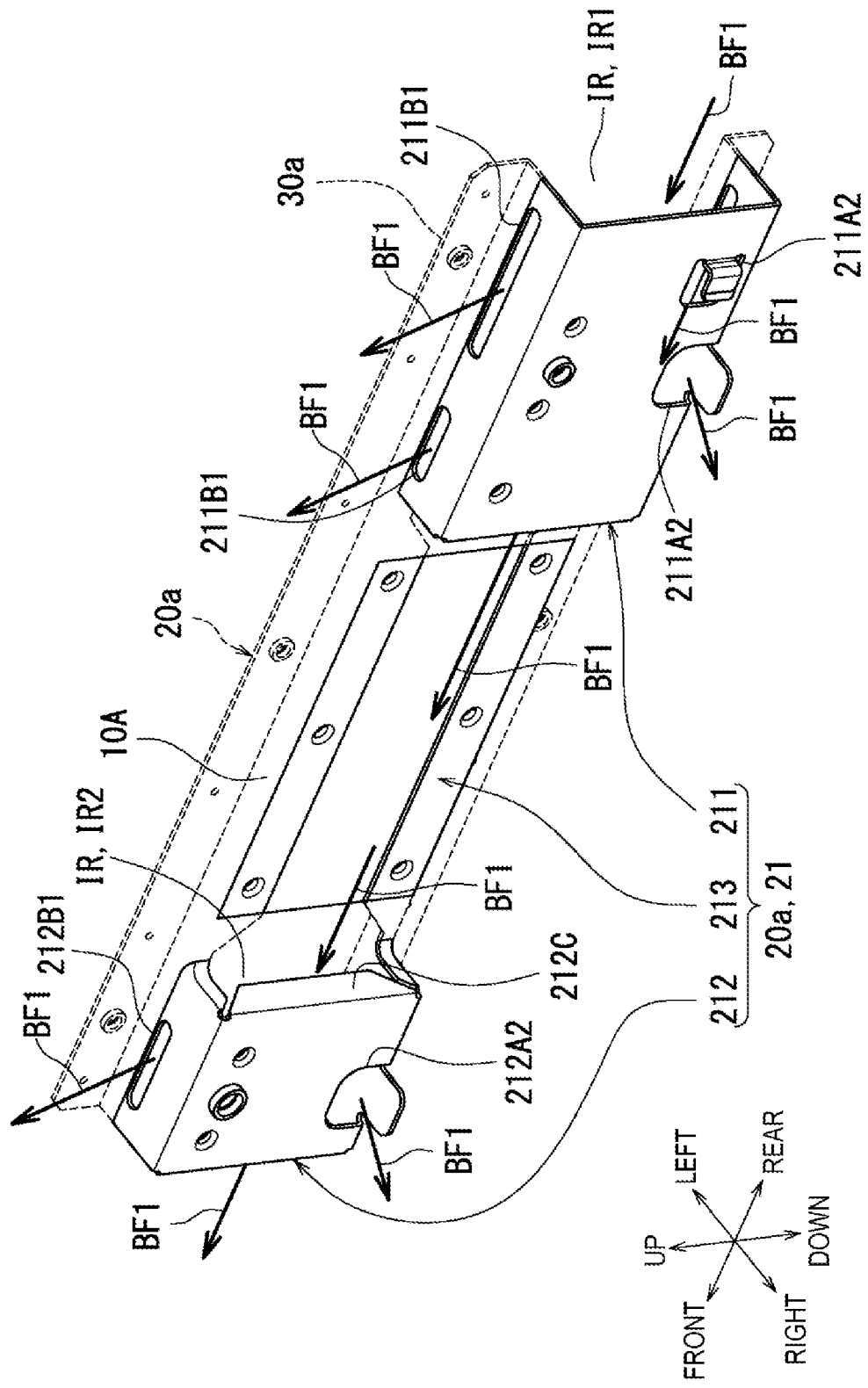
FIG. 19 is a perspective view illustrating the right support portion attached to the heating cooking chamber according to the embodiment of the present invention.
Figure 20:
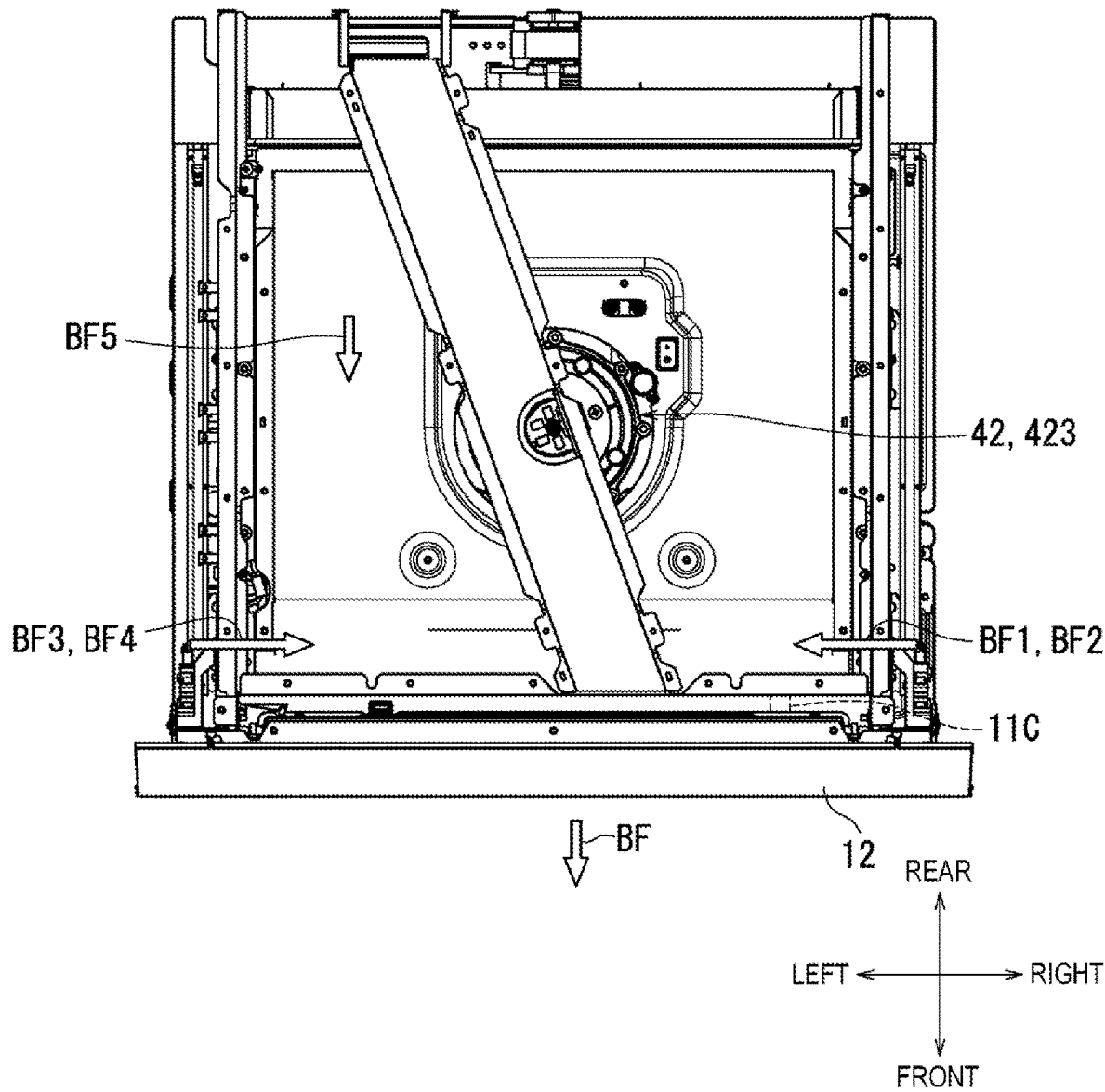
FIG. 20 is a diagram illustrating an upper surface of the heating cooking apparatus according to the embodiment of the present invention.
Figure 21:
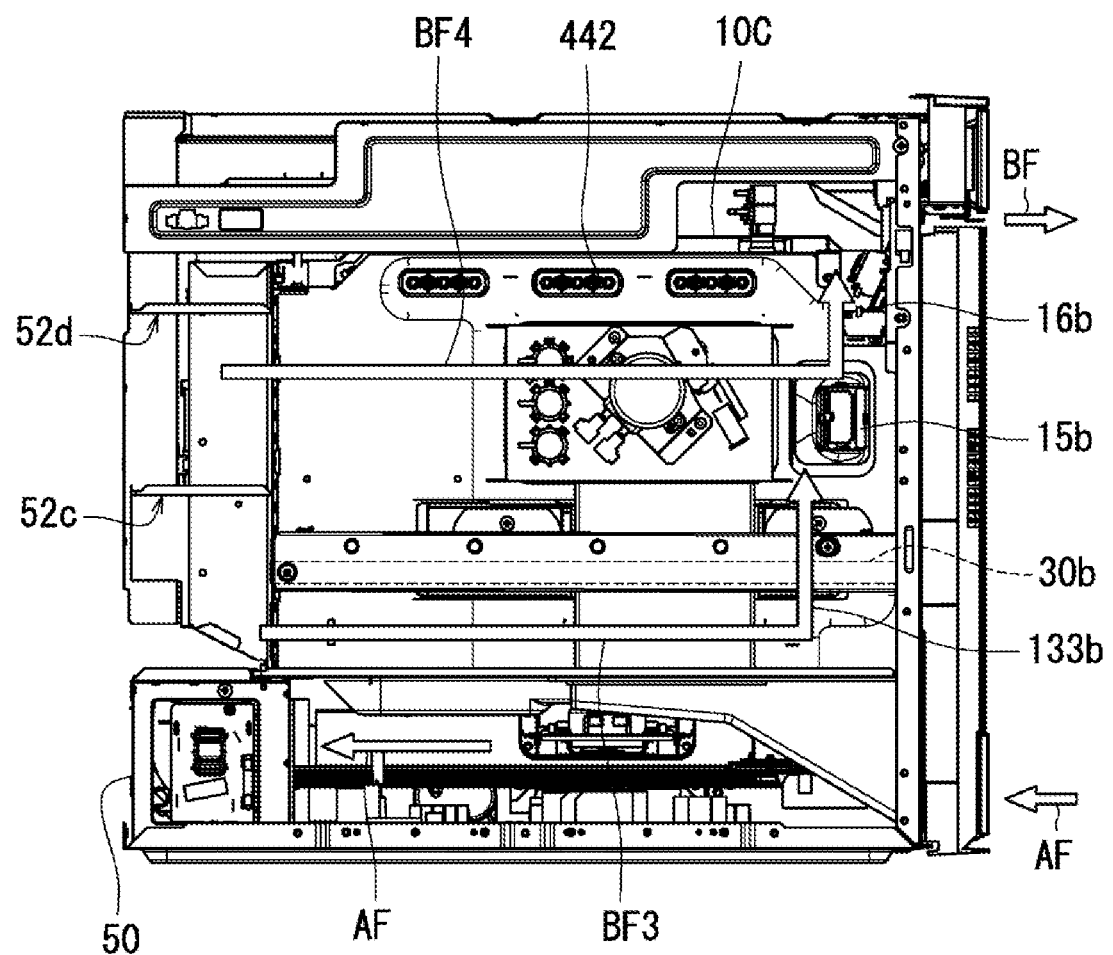
FIG. 21 is a diagram illustrating a left side surface of the heating cooking apparatus according to the embodiment of the present invention.

Next, a flow of air generated by the drive of the cooling fan 50 will be described with reference to FIG. 17 to FIG. 21. FIG. 17 is a diagram illustrating a right side surface of the heating cooking apparatus 1 according to the present embodiment. FIG. 18 is a diagram illustrating a back surface of the heating cooking apparatus 1 according to the present embodiment. FIG. 19 is a perspective view illustrating the right support portion 20a attached to the heating cooking chamber 10 according to the present embodiment. In FIG. 19, a dashed line indicates a portion located within the right wall 10A. FIG. 20 is a diagram illustrating an upper surface of the heating cooking apparatus 1 according to the present embodiment. FIG. 21 is a diagram illustrating a left side surface of the heating cooking apparatus 1 according to the present embodiment. In FIG. 17, FIG. 18, FIG. 20, and FIG. 21, the housing 14 is omitted.

As illustrated in FIG. 17, when the cooling fan 50 is driven, an intake air flow AF is generated. The intake air flow AF flows through the inside of the air intake space AR described with reference to FIG. 8. At this time, the intake air flow AF cools a power supply and the electrical components that are located in the air intake space AR.

When the cooling fan 50 is driven, the blown air flow BF is generated. The blown air flow BF described with reference to FIG. 8 flows through the inside of the exhaust space BR.

The blown air flow BF is mainly branched into a first blown air flow BF1 to a fifth blown air flow BF5 as illustrated in FIG. 18 by the plurality of air deflecting plates 52 described with reference to FIG. 9 to FIG. 11.

The first blown air flow BF1 is formed by the first air deflecting plate 52*a*. More specifically, the first blown air flow BF1 is formed through a process in which part of the blown air flow BF blown out upward comes into contact with the first air deflecting plate 52*a* and flows toward the right slide rail 30*a*. Hereinafter, an inner space IR formed between the rear fixing portion 211 of the right support portion 20*a* and the right wall 10A will be referred to as a "first inner space IR1" (see FIG. 19). Hereinafter, an inner space IR formed between the front fixing portion 212 of the right support portion 20*a* and the right wall 10A will be referred to as a "second inner space IR2" (see FIG. 19).

As illustrated in FIG. 19, the first blown air flow BF1 flowing along the right slide rail 30*a* flows through the first inner space IR1. Subsequently, the first blown air flow BF1 discharged from the first inner space IR1 flows through the second inner space IR2. In this case, in the present embodiment, the first blown air flow BF1 discharged from the first inner space IR1 more easily comes into contact with the right slide rail 30*a* (see FIG. 17) than in a case where the right support portion 20*a* does not include a notched portion 213 before flowing through the second inner space IR2. That is, the right slide rail 30*a* is more easily cooled.

As illustrated in FIG. 17, after flowing along the right slide rail 30*a*, the first blown air flow BF1 flows upward. At this time, the first blown air flow BF1 cools the right slide member 133*a*, the right slide rail 30*a*, the right in-chamber light component 15*a*, the right latch switch 16*a*, and the like.

Subsequently, as illustrated in FIG. 20, the first blown air flow BF1 flows toward the exhaust hole portion 11C described with reference to FIG. 6 along the upper wall 10C of the heating cooking chamber 10. At this time, the first blown air flow BF1 joins the second blown air flow BF2 to the fifth blown air flow BF5. Subsequently, the blown air flow BF having a temperature risen through heat exchange due to cooling is discharged to the outside of the heating cooking apparatus 1 through the exhaust hole portion 11C of the panel 11.

As illustrated in FIG. 18, the second blown air flow BF2 is formed by the second air deflecting plate 52*b*. More specifically, the second blown air flow BF2 is formed through a process in which part of the blown air flow BF blown out upward comes into contact with the second air deflecting plate 52*b* and flows toward the air supply damper 45*a*. As illustrated in FIG. 17, after flowing along the right wall 10A of the heating cooking chamber 10, the second blown air flow BF2 flows upward. At this time, part of the second blown air flow BF2 is supplied to the interior of the accommodation space 1A when the air supply damper 45*a* opens the air supply hole portions 10A1 of the heating cooking chamber 10. Further, the second blown air ow BF2 cools the right in-chamber light component 15*a*, the right latch switch 16*a*, and the like.

Subsequently, as illustrated in FIG. 20, the second blown air flow BF2 flows toward the exhaust hole portion 11C described with reference to FIG. 6 along the upper wall 10C of the heating cooking chamber 10. At this time, the second blown air flow BF2 joins the first blown air flow BF1 and the third blown air flow BF3 to the fifth blown air flow BF5. Subsequently, the blown air flow BF having a temperature risen through heat exchange due to cooling is discharged to the outside of the heating cooking apparatus 1 through the exhaust hole portion 11C of the panel 11.

As illustrated in FIG. 18, the third blown air flow BF3 is formed by the third air deflecting plate 52*c*. More specifically, the third blown air flow BF3 is formed through a process in which the blown air flow BF blown out upward comes into contact with the third air deflecting plate 52*c* and flows toward the left slide rail 30*b*. As illustrated in FIG. 21, after flowing along the left slide rail 30*b*, the third blown air flow BF3 flows upward. At this time, the third blown air flow BF3 cools the left, slide member 133*b*, the left slide rail 30*b*, the left in-chamber light component 15*b*, the left latch switch 16*b*, and the like.

Subsequently, as illustrated in FIG. 20, the third blown air flow BF3 flows toward the exhaust hole portion 11C described with reference to FIG. 6 along the upper wall 10C of the heating cooking chamber 10. At this time, the third blown air flow BF3 joins the first blown air flow BF1, the second blown air flow BF2, the fourth blown air flow BF4, and the fifth blown air flow BF5. Subsequently, the blown air flow BF having a temperature risen through heat exchange due to cooling is discharged to the outside of the heating cooking apparatus 1 through the exhaust hole portion 11C of the panel 11.

As illustrated in FIG. 18, the fourth blown air flow BF4 is formed by the fourth air deflecting plate 52*d*. More specifically, the fourth blown air flow BF4 is formed through a process in which part of the blown air flow BF blown out upward comes into contact with the fourth air deflecting plate 52*d* and flows toward the third energization unit 442 of the grill unit 44.

As illustrated in FIG. 21, after flowing along the left wall 10B of the heating cooking chamber 10, the fourth blown air flow BF1 flows upward. At this time, the fourth blown air flow BF4 cools the third energization unit 442 of the grill unit 44, the left in-chamber light component 15*b*, the left latch switch 16*b*, and the like.

Subsequently, as illustrated in FIG. 20, the fourth blown air flow BF4 flows toward the exhaust hole portion 11C described with reference to FIG. 6 along the upper wall 10C of the heating cooking chamber 10. At this time, the fourth blown air flow BF4 joins the first blown air flow BF1 to the third blown air flow BF3, and the fifth blown air flow BF5. Subsequently, the blown air flow BF having a temperature risen through heat exchange due to cooling is discharged to the outside of the heating cooking apparatus 1 through the exhaust hole portion 11C of the panel 11.

As illustrated in FIG. 18, the fifth blown air flow BF5 is formed by not coming into contact with the plurality of air deflecting plates 52. The fifth blown air flow BF5 flows upward along the outer surface of the rear wall 10E of the heating cooking chamber 10. Subsequently, as illustrated in FIG. 20, the fifth blown air flow BF5 flows toward the exhaust hole portion 11C described with reference to FIG. 6 along the upper wall 10C of the heating cooking chamber 10. At this time, the fifth blown air flow BF5 joins the first blown air flow BF1 to the fourth blown air flow BF4. Subsequently, the blown air flow BF having a temperature risen through heat exchange due to cooling is discharged to the outside of the heating cooking apparatus 1 through the exhaust hole portion 11C of the panel 11.

Figure 22:
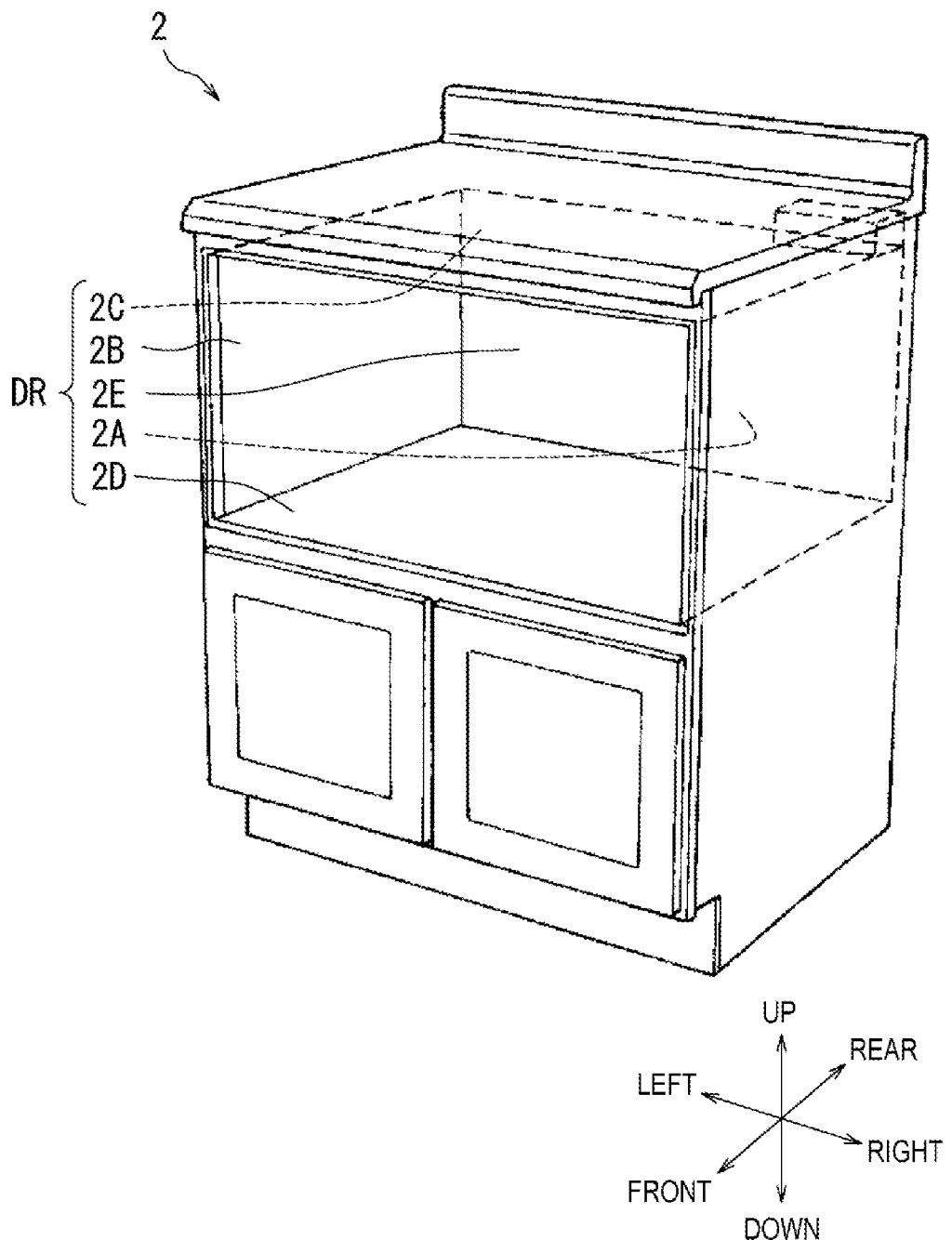
FIG. 22 is a diagram illustrating an appearance of a cabinet with the built-in heating cooking apparatus according to the present embodiment.

Next, a cabinet 2 with the built-in heating cooking apparatus 1 will be described with reference to FIG. 22. FIG. 22 is a diagram illustrating an external appearance of the cabinet 2 with the built-in heating cooking apparatus 1 according to the present embodiment.

The heating cooking apparatus 1 is disposed in the form of being built into the cabinet 2. As illustrated in FIG. 22, the cabinet 2 includes an accommodation space DR. The heating cooking apparatus 1 is disposed in the accommodation space DR. The accommodation space DR is a space having a rectangular parallelepiped shape. The cabinet 2 includes a right inner surface 2A, a left inner surface 2B, an upper inner surface 2C, a lower inner surface 2D, and a rear inner surface 2E. The accommodation space DR is formed by the right inner surface 2A, the left inner surface 2B, the upper inner surface 2C, the lower inner surface 2D, and the rear inner surface 2E.

As described with reference to FIG. 1 to FIG. 22, the heating cooking apparatus 1 includes the heating cooking chamber 10, the first air sending unit 41, the second air sending unit 42, the grill unit 44, the housing 14, the cooling fan 50, the pull-out body 13, the pair of slide rails 30, the first air deflecting plate 52a, and the third air deflecting plate 52c. The temperature of the outer surface of the heating cooking chamber 10 becomes high temperature when the first air sending unit 41, the second air sending unit 42, or the grill unit 44 is driven. The temperatures of the pair of slide rails 30 rise due to heat transfer from the outer surface of the heating cooking chamber 10 to the pair of slide rails 30. The first air deflecting plate 52a and the third air deflecting plate 52c guide part of the blown air flow BF so that the blown air flow BF flows along the pair of slide rails 30. Thereby, the heating cooking apparatus 1 can efficiently cool the pair of slide rails 30 due to heat exchange between the high-temperature pair of slide rails 30 and the low-temperature blown air flow BF when the first air sending unit 41, the second air sending unit 42, or the grill unit 44 is driven. As a result, the heating cooking apparatus 1 can enhance durability of the pair of slide rails 30.

As described with reference to FIG. 1 to FIG. 22, the first air deflecting plate 52a includes a lower surface of the first flat plate portion 52a1. The lower surface of the first flat plate portion 52a1 extends in the front-rear direction in which the pull-out body 13 slides. The third air deflecting plate 52c includes a lower surface of the first flat plate portion 52c1. The lower surface of the first flat plate portion 52c1 extends in the front-rear direction in which the pull-out body 13 slides. Accordingly, when part of the blown air flow BF blown out upward from the cooling fan 50 comes into contact with the lower surface of the first flat plate portion 52a1, the blown air flow BF is guided in a direction in which the lower surface of the first flat plate portion 52a1 extends. That is, the lower surface of the first flat plate portion 52a1 forms the first blown air flow BF1 from part of the blown air flow BF. Similarly, the lower surface of the first flat plate portion 52c1 forms the third blown air flow BF3 from part of the blown air flow BF. Accordingly, part of the blown air flow BF easily flows along the pair of slide rails 30. As a result, the heating cooking apparatus 1 can efficiently cool the pair of left and right slide rails 30 when the first air sending unit 41, the second air sending unit 42, or the grill unit 44 is driven.

As described with reference to FIG. 1 to FIG. 22, the heating cooking apparatus 1 includes the pair of left and right support portions 20. Accordingly, heat of the outer surface of the heating cooking chamber 10 is less likely to be heat-transferred to the pair of left and right slide rails 30 than in a case where the pair of slide rails 30 are directly attached to the outer surface of the heating cooking chamber 10. As a result, the heating cooking apparatus 1 can more efficiently cool the pair of left and right slide rails 30 when the first air sending unit 41, the second air sending unit 42, or the grill unit 44 is driven.

As described with reference to FIG. 1 to FIG. 22, in the present embodiment, the pair of left and right support portions 20 include the right support portion 20a and the left support portion 20b. The right support portion 20a includes the distribution portion 21. The distribution portion 21 includes the rear fixing portion 211, the front fixing portion 212, and the notched portion 213. Accordingly, the first blown air flow BF1 flowing through the inside of the first inner space IR1 is more easily to come into contact with the right slide rail 30a than in a case where the distribution portion 21 does not include the notched portion 213. In addition, the right slide rail 30a comes into contact with the distribution portion 21 of the right support portion 20a. Heat of the outer surface of the heating cooking chamber 10 is heat-transferred to the right slide rail 30a via the distribution portion 21. A contact area between the right slide rail 30a and the right support portion 20a is smaller than a contact area in a case where the distribution portion 21 does not include the notched portion 213. For this reason, heat of the outer surface of the heating cooking chamber 10 is less likely to be heat-transferred to the right slide rail 30a. The configuration of the left support portion 20b is substantially the same as the configuration of the right support portion 20a. Accordingly, the left support portion 20b has the same operational effect as that of the right support portion 20a. For this reason, the heating cooking apparatus 1 can more efficiently cool the pair of left and right slide rails 30 when the first air sending unit 41, the second air sending unit 42, or the grill unit 44 is driven.

As described with reference to FIG. 1 to FIG. 22, the front fixing portion 212 of the right support portion 20a includes bent portions 212c. Thereby, it is possible to improve the strength of the right support portion 20a. The configuration of the left support portion 20b is substantially the same as the configuration of the right support portion 20a. Accordingly, the left support portion 20b has the same operational effect as that of the right support portion 20a. As a result, the heating cooking apparatus 1 can enhance strength of the pair of left and right support portions 20.

As described with reference to FIG. 1 to FIG. 22, the right support portion 20a includes the ventilation holes 211A2, the ventilation holes 211B1, the ventilation hole 212A2, and the ventilation holes 212B1. Accordingly, the first blown air flow BF1 flowing through the inside of the first inner space IR1 or the second inner space IR2 is heated by heat exchange with the right support portion 20a. The heated first blown air flow BF1 easily flows from the inside of the first inner space IR1 or the second inner space IR2 into the exhaust space BR. For this reason, the heating cooking apparatus 1 can efficiently cool the right support portion 20a. The configuration of the left support portion 20b is substantially the same as the configuration of the right support portion 20a. Accordingly, the left support portion 20b has the same operational effect as that of the right support portion 20a. For this reason, the heating cooking apparatus 1 can efficiently cool the left support portion 20b. As a result, the heating cooking apparatus 1 can more efficiently cool the pair of left and right slide rails 30 when the first air sending unit 41, the second air sending unit 42, or the grill unit 44 is driven.

As described with reference to FIG. 1 to FIG. 22, the right support portion 20a includes the ventilation holes 211B1 and the ventilation holes 212B1. The temperature of the outer surface of the heating cooking chamber 10 is heat-transferred to the right slide rail 30a through a first path and a second path. The first path indicates a path from left edge portions of the pair of rear standing walls 211B of the right support portion 20a to the rear facing wall 211A of the right support portion 20a. The second path indicates a path from left edge portions of the pair of front standing walls 212B of the right support portion 20a to the front facing wall 212A of the right support portion 20a. The ventilation holes 211B1 can easily make a path of heat transfer from the left edge portions of the pair of rear standing walls 211B to the rear facing wall 211A non-linear. The ventilation holes 212B1 can easily make a path of heat transfer from the left edge portions of the pair of front standing walls 212B to the front facing wall 212A non-linear. For this reason, heat of the outer surface of the heating cooking chamber 10 is less likely to be heat-transferred to the right slide rail 30a than in a case where the right support portion 20a does not include the ventilation holes 211B1 and the ventilation holes 212B2. The configuration of the left support portion 20b is substantially the same as the configuration of the right support portion 20a. Accordingly, the left support portion 20b has the same operational effect as that of the right support portion 20a. As a result, the heating cooking apparatus 1 can more efficiently cool the pair of left and right slide rails 30 when the first air sending unit 41, the second air sending unit 42, or the grill unit 44 is driven.

As described with reference to FIG. 1 to FIG. 22, the heating cooking apparatus 1 includes the microwave supply unit 43. Thereby, the heating cooking apparatus 1 is capable of heating and cooking by using microwaves.

As described with reference to FIG. 1 to FIG. 22, the heating cooking apparatus 1 includes the first air sending unit 41 and the second air sending unit 42. Thereby, the heating cooking apparatus 1 is capable of heating and cooking by using hot air under different heat conditions.

As described with reference to FIG. 1 to FIG. 22, the heating cooking apparatus 1 includes the grill unit 44 and the fourth air deflecting plate 52d. The fourth air deflecting plate 52d functions as an air deflecting plate for the grill unit. The grill unit 44 includes the heating cooking heater unit 441 and the third energization unit 442. The fourth air deflecting plate 52d guides the fourth blown air flow BF4 to the third energization unit 442. The heating cooking apparatus 1 is capable of heating and cooking by using radiant heat. The heating cooking apparatus 1 can cool the third energization unit 442 of the grill unit 44 by the fourth blown air flow BF4.

As described with reference to FIG. 1 to FIG. 22, the heating cooking apparatus 1 includes the partition plate 51. The temperature of air in the exhaust space BR is higher than the temperature of air in the air intake space AR due to the temperature of the outer surface of the heating cooking chamber 10, or the like. The partition plate 51 can more reliably prevent air in the air intake space AR and air in the exhaust space BR from being mixed together. Thereby, the heating cooking apparatus 1 can easily blow out low-temperature air into the exhaust space BR. As a result, the heating cooking apparatus 1 can efficiently cool the components to be cooled.

As described with reference to FIG. 1 to FIG. 22, the panel 11 includes the opening portion 11A. As illustrated in FIG. 6, the air intake hole portion 11BA and the exhaust hole portion 11C are disposed to interpose the opening portion 11A therebetween. Thereby, the high-temperature air discharged through the exhaust hole portion 11C is less likely to be taken in through the air intake hole portion 11BA. As a result, the heating cooking apparatus 1 can efficiently cool the components to be cooled.

As described with reference to FIG. 1 to FIG. 22, the air intake hole portion 11BA is disposed below the opening portion 11A. The exhaust hole portion 11C is disposed above the opening portion 11A. The high-temperature air more easily rises than the low-temperature air. For this reason, the high-temperature air discharged through the exhaust hole portion 11C is less likely to be taken in through the air intake hole portion 11BA. As a result, the heating cooking apparatus 1 can more efficiently cool the components to be cooled. Further, the heating cooking apparatus 1 can efficiently inhibit the temperature rise of the components to be cooled even when there is no space for disposing the air intake hole portion 11BA and the exhaust hole portion 11C on the right and the left of the opening portion 11A.

As described with reference to FIG. 1 to FIG. 22, the cooling fan 50 is located at the same height as the air intake hole portion 11BA. Thereby, the cooling fan 50 can more easily take in air through the air intake hole portion 11BA as compared to when the cooling fan 50 is not disposed at the same height as the air intake hole portion 11BA. As a result, the heating cooking apparatus 1 can more efficiently cool the components to be cooled.

As described with reference to FIG. 1 to FIG. 22, the cooling fan 50 is located behind the heating cooking chamber 10. Thereby, the cooling fan 50 can blow out air from the rear of the heating cooking chamber 10. Thereby, the heating cooking apparatus 1 can more easily guide the blown air flow BF to each of the components to be cooled. As a result, the heating cooking apparatus 1 can more efficiently cool the components to be cooled.

As described with reference to FIG. 1 to FIG. 22, the cooling fan 50 includes a cross-flow fan. The cross-flow fan can take in air over a wide range in the left-right direction (horizontal direction) compared to a centrifugal blower. Thus, the heating cooking apparatus 1 can efficiently take in air through the air intake hole portion 11BA and can more efficiently cool the components to be cooled. The centrifugal blower includes a sirocco fan.

In the above, the embodiment of the present invention has been described with reference to the drawings (FIG. 1 to FIG. 22). Note that the present invention is not limited to the embodiment described above and can be implemented in various modes within the scope not departing from the gist of the present invention (for example, (1) to (17) described below). The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. Further, the material, shape, dimensions, and the like of each of the constituent elements illustrated in the embodiment described above are merely examples and are not particularly limited, and various modifications can be made within the scope not substantially departing from the effects of the present invention.

(1) As described with reference to FIG. 1 to FIG. 22, in the present embodiment, the pair of slide rails 30 are located in the exhaust space BR. That is, the pair of slide rails 30 are mainly cooled by the first blown air flow BF1 and the third blown air flow BF3. However, the present invention is not limited thereto. For example, the pair of slide rails 30 may be located in the air intake space AR. That is, the pair of slide rails 30 may be cooled by the intake air flow AF.

(2) As described with reference to FIG. 1 to FIG. 22, the present embodiment includes, as guide surfaces, a lower surface of the first flat plate portion 52a1 of the first air deflecting plate 52a and a lower surface of the first flat plate portion 52c1 of the third air deflecting plate 52c, The lower surface of the first flat plate portion 52a1 and the lower surface of the first flat plate portion 52c1 are flat surfaces extending in the front-rear direction. However, the present invention is not limited thereto. For example, the lower surface of the first flat plate portion 52a1 and the lower surface of the first flat plate portion 52c1 may be curved surfaces or the like as long as at least part of the blown air flow BF can be guided to flow along the pair of left and right slide rails 30.

(3) As described with reference to FIG. 1 to FIG. 22, in the present embodiment, the first air deflecting plate 52a and the third air deflecting plate 52c are attached to the rear wall 10E of the heating cooking chamber 10, but the present invention is not limited thereto. For example, the first flat plate portion 52a1 of the first air deflecting plate 52a may be attached to the right wall 10A of the heating cooking chamber 10, and the second flat plate portion 52a2 of the first air deflecting plate 52a may be attached to the rear wall 10E of the heating cooking chamber 10. In addition, the first flat plate portion 52c1 of the third air deflecting plate 52c may be attached to the left wall 101B of the heating cooking chamber 10, and the second flat plate portion 52c2 of the third air deflecting plate 52c may be attached to the rear wall 10E of the heating cooking chamber 10.

(4) As described with reference to FIG. 1 to FIG. 22, in the present embodiment, the heating cooking apparatus 1 includes the pair of left and right support portions 20, but the present invention is not limited thereto. The heating cooking apparatus 1 may not include the pair of left and right support portions 20. In a case where the heating cooking apparatus 1 does not include the pair of left and right support portions 20, the pair of left and right slide rails 30 may be directly attached to the outer surface of the heating cooking chamber 10.

(5) As described with reference to FIG. 1 to FIG. 22, in the present embodiment, the distribution portion 21 of each of the pair of left and right support portions 20 includes the notched portion 213, hut the present invention is not limited thereto. The distribution portion 21 of each of the pair of left and right support portions 20 may not include the notched portion 213.

(6) As described with reference to FIG. 1 to FIG. 22, in the present embodiment, the distribution portion 21 of each of the pair of left and right support portions 20 includes the ventilation holes 211A2, the ventilation holes 211B1, the ventilation hole 212A2, and the ventilation holes 212B1, hut the present invention is not limited thereto. The distribution portion 21 of each of the pair of left and right support portions 20 may not include the ventilation holes 211A2, the ventilation holes 211B1, the ventilation hole 212A2, and the ventilation holes 212B1.

(7) As described with reference to FIG. 1 to FIG. 22, the front fixing portion 212 of the right support portion 20a includes bent portions 212c, but the present invention is not limited thereto. The front fixing portion 212 of the right support portion 20a may not include the bent portions 212c.

(8) As described with reference to FIG. 1 to FIG. 22, in the present embodiment, the heating cooking apparatus 1 includes the microwave supply unit 43, but the present invention is not limited thereto. The heating cooking apparatus 1 may not include the microwave supply unit 43.

(9) As described with reference to FIG. 1 to FIG. 22, in the present embodiment, the heating cooking apparatus 1 includes the first air sending unit 41, the second air sending unit 42, and the grill unit 44, but the present invention is not limited thereto. For example, the heating cooking apparatus 1 may include one or two of the first air sending unit 41, the second air sending unit 42, and the grill unit 44.

(10) As described with reference to FIG. 1 to FIG. 22, in the present embodiment, the heating cooking apparatus 1 includes the partition plate 51, but the present invention is not limited thereto. The heating cooking apparatus 1 may not include the partition plate 51. In this case, part of the outer surface S10 of the heating cooking chamber 10 and the inner surface S14 of the housing 14 may come into contact with each other to form the air intake space AR and the exhaust space BR.

(11) As described with reference to FIG. 1 to FIG. 22, in the present embodiment, the air intake hole portion 11BA and the exhaust hole portion 11C are disposed to interpose the opening portion 11A therebetween, but the present invention is not limited thereto. For example, the air intake hole portion 11BA and the exhaust hole portion 11C may be disposed on the same side as the opening portion 11A.

(12) As described with reference to FIG. 1 to FIG. 22, in the present embodiment, the air intake hole portion 11BA is disposed below the opening portion 11A and the exhaust hole portion 11C is disposed above the opening portion 11A, but the present invention is not limited thereto. For example, the air intake hole portion 11BA may be disposed above the opening portion 11A, and the exhaust hole portion 11C may be disposed below the opening portion 11A. Further, the air intake hole portion 11BA may be disposed on the left of the opening portion 11A, and the exhaust hole portion 11C may be disposed on the right of the opening portion 11A.

(13) As described with reference to FIG. 1 to FIG. 22, in the present embodiment, the cooling fan 50 is located at the same height as the air intake hole portion 11BA, but the present invention is not limited thereto. The cooling fan 50 may not be located at the same height as the air intake hole portion 11BA.

(14) As described with reference to FIG. 1 to FIG. 22, in the present embodiment, the cooling fan 50 is located behind the heating cooking chamber 10, but the present invention is not limited thereto. The cooling fan 50 may not be located behind the heating cooking chamber 10.

(15) As described with reference to FIG. 1 to FIG. 22, in the present embodiment, a cross-flow fan is used as the cooling fan 50, but the present invention is not limited thereto. For example, as the cooling fan 50, a centrifugal fan may be used, or a compressor may be used. Further, in the present embodiment, as the cooling fan 50, two cross-flow fans are used, but the present invention is not limited thereto. For example, as the cooling fan 50, only one cross-flow fan may be used, or three or more cross-flow fans may be used.

(16) As described with reference to FIG. 1 to FIG. 22, in the present embodiment, the cooling fan 50 is disposed behind the heating cooking chamber 10 and below the heating cooking chamber 10, but the present invention is not limited thereto. For example, the cooling fan 50 may be disposed behind the heating cooking chamber 10 and above the heating cooking chamber 10. In this case, the shape of the partition plate 51 may be adjusted in order to form the air intake space AR.

(17) As described with reference to FIG. 1 to FIG. 22, in the present embodiment, the first blown air flow BF1 flows through the inside of the first inner space IR1 and the second inner space IR2, but the present invention is not limited thereto. For example, the first inner space IR1 and the second inner space IR2 may be filled with an insulating material. That is, the first blown air flow BF1 may not flow through the inside of the first inner space IR1 and the second inner space IR2.

INDUSTRIAL APPLICABILITY

The present invention is useful, for example, in the field of a heating cooking apparatus.

REFERENCE SIGNS LIST

1 Heating cooking apparatus
10 Heating cooking chamber
13 Pull-out body
14 Housing
30 Slide rail
41 First air sending unit
42 Second air sending unit
44 Grill unit
50 Fan
52a First air deflecting plate
52c Third air deflecting plate
BF Blown air flow
R Space

The invention claimed is:

1. A heating cooking apparatus comprising:
a heating cooking chamber where an object to be heated is accommodated;
a heat supply unit configured to supply heat to an interior of the heating cooking chamber;
a housing configured to accommodate the heating cooking chamber;
a fan disposed in a space formed between an outer surface of the heating cooking chamber and an inner surface of the housing, and the fan configured to generate an air flow;
a pull-out body configured to be pulled out freely relative to the heating cooking chamber;
a slide rail attached to the outer surface of the heating cooking chamber and configured to slidably support the pull-out body;
at least one air deflecting plate configured to guide the air flow to flow along the slide rail; and
a support portion attached to the outer surface of the heating cooking chamber and configured to support the slide rail, wherein:
the heat supply unit includes an air sending unit configured to supply hot air to the interior of the heating cooking chamber,
the support portion includes a distribution portion configured to form an inner space where the air flow flows between the distribution portion and the outer surface of the heating cooking chamber, and
the distribution portion includes two fixing portions where the slide rail is fixed, and a notched portion formed between the two fixing portions in a sliding direction where the pull-out body slides.

2. The heating cooking apparatus according to claim 1, wherein the at least one air deflecting plate includes a guide surface extending in a sliding direction where the pull-out body slides.

3. The heating cooking apparatus according to claim 1, wherein at least one of the two fixing portions includes a bent portion that bends toward the heating cooking chamber.

4. The heating cooking apparatus according to claim 1, wherein the distribution portion further includes a through hole.

5. The heating cooking apparatus according to claim 1, further comprising:
a microwave supply unit configured to supply a microwave to the interior of the heating cooking chamber.

* * * * *